(12) United States Patent
Kashihara et al.

(10) Patent No.: US 6,456,763 B2
(45) Date of Patent: Sep. 24, 2002

(54) ARRAYED WAVEGUIDE GRATING TYPE OPTICAL MULTIPLEXER/DEMULTIPLEXER AND A METHOD OF MANUFACTURING THE SAME

(75) Inventors: Kazuhisa Kashihara; Kazutaka Nara; Yoshinobu Nekado, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 32 days.

(21) Appl. No.: 09/741,792

(22) Filed: Dec. 22, 2000

(30) Foreign Application Priority Data

Dec. 27, 1999 (JP) .............................. 11-370457
Jun. 13, 2000 (JP) ........................... 2000-176691
Sep. 19, 2000 (JP) ........................... 2000-283806

(51) Int. Cl.$^7$ .............................. G02B 6/34; G02B 6/12; H04J 14/02
(52) U.S. Cl. .............................. 385/37; 385/24; 385/14; 385/18; 385/46; 359/115; 359/124; 359/130
(58) Field of Search .............................. 385/24, 37, 14, 385/18, 17, 20, 25, 46–47, 129–131; 359/115, 124, 130

(56) References Cited

U.S. PATENT DOCUMENTS 5,617,234 A * 4/1997 Koga et al. .................. 359/131
6,222,963 B1 * 4/2001 Grand et al. .................. 385/59
6,304,687 B1 * 10/2001 Inoue et al. .................. 385/14

FOREIGN PATENT DOCUMENTS

JP     11-218639     8/1999
JP     2000-292632     10/2000

* cited by examiner

*Primary Examiner*—Brian Healy
*Assistant Examiner*—Jerry T Rahll
(74) *Attorney, Agent, or Firm*—Oblon, Spivak, McClelland, Maier & Neustadt, P.C.

(57) ABSTRACT

An arrayed waveguide grating type optical multiplexer/demultiplexer in which a light transmission central wavelength is independent of temperature. A substrate is formed on a waveguide forming region in which optical input waveguides, a first slab waveguide, an arrayed waveguide including a plurality of channel waveguides that are arranged side by side, a second slab waveguide, and a plurality of optical output waveguides arranged side by side are sequentially connected. Dividing lines are set to divide the first slab waveguide into two by intersecting dividing planes that intersect with a route of light traveling along the first slab waveguide. A position shifting member is fixed so as to be secured in a waveguide forming region at its one end and in a waveguide forming region on its other end. The position shifting member fixes to a base the waveguide forming region on the side of a divided slab waveguide and slides the waveguide forming region on the side of another divided slab waveguide. An arrayed waveguide grating is then divided at the dividing lines, separating the first and second waveguide forming regions from each other.

22 Claims, 13 Drawing Sheets

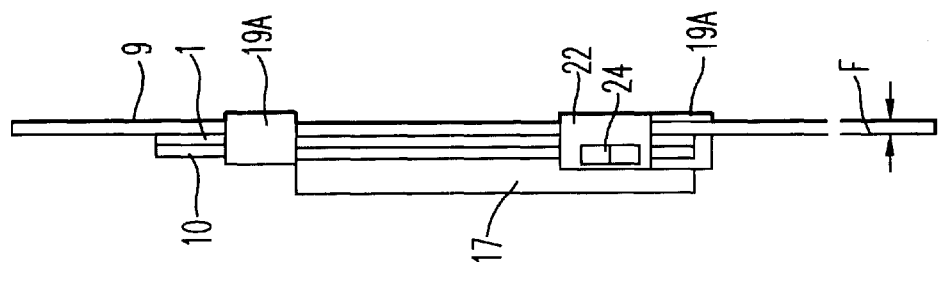
FIG. 1B
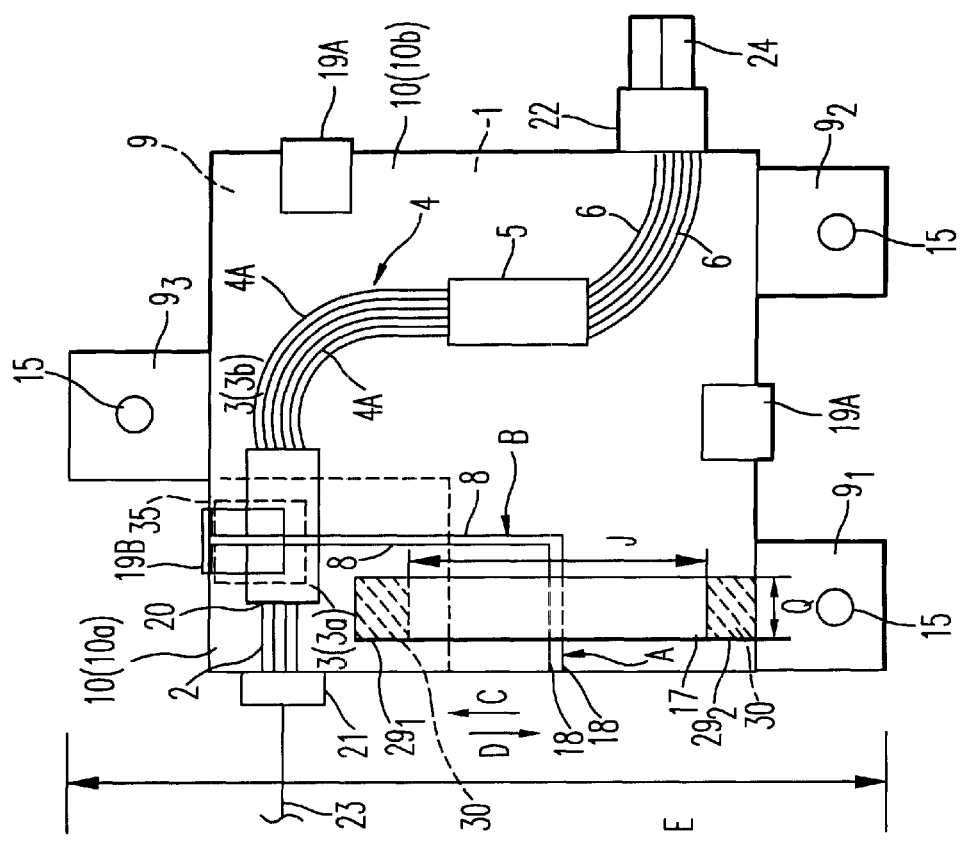
FIG. 1A
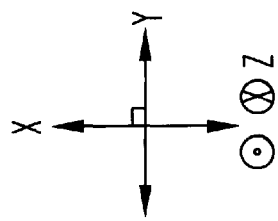

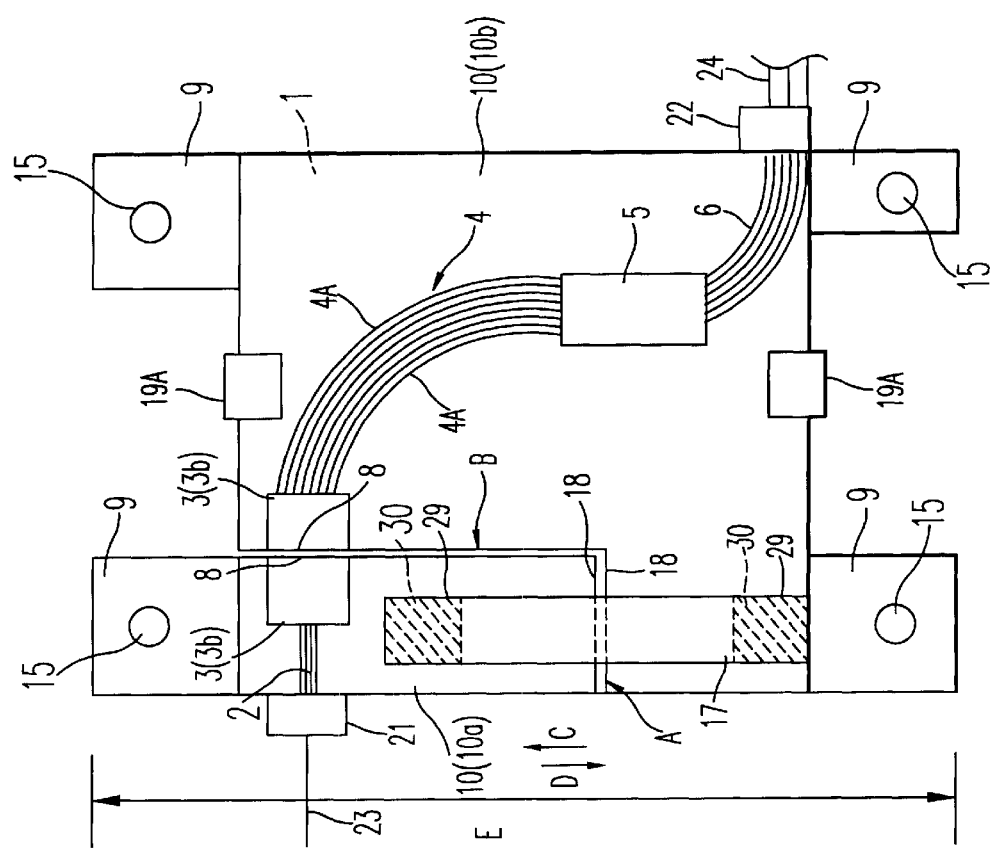
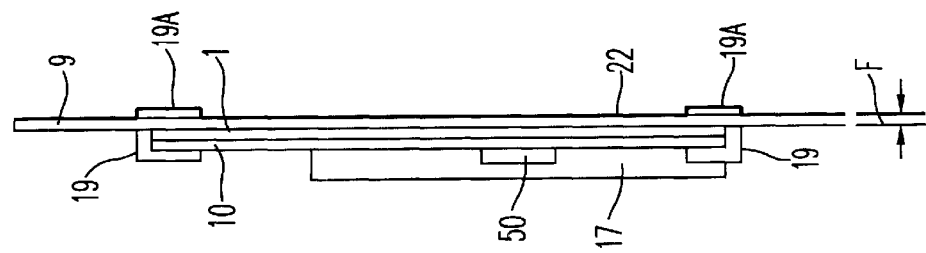
FIG. 6A
FIG. 6B

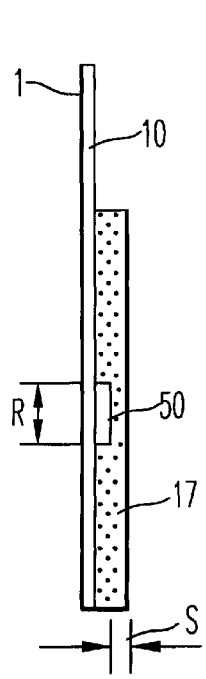
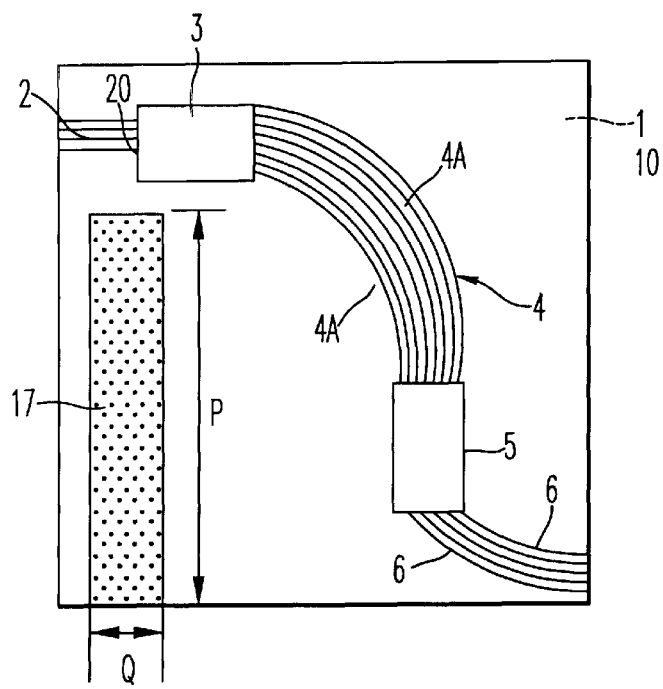
FIG. 8A    FIG. 8B
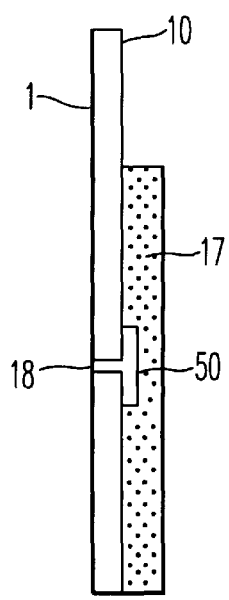
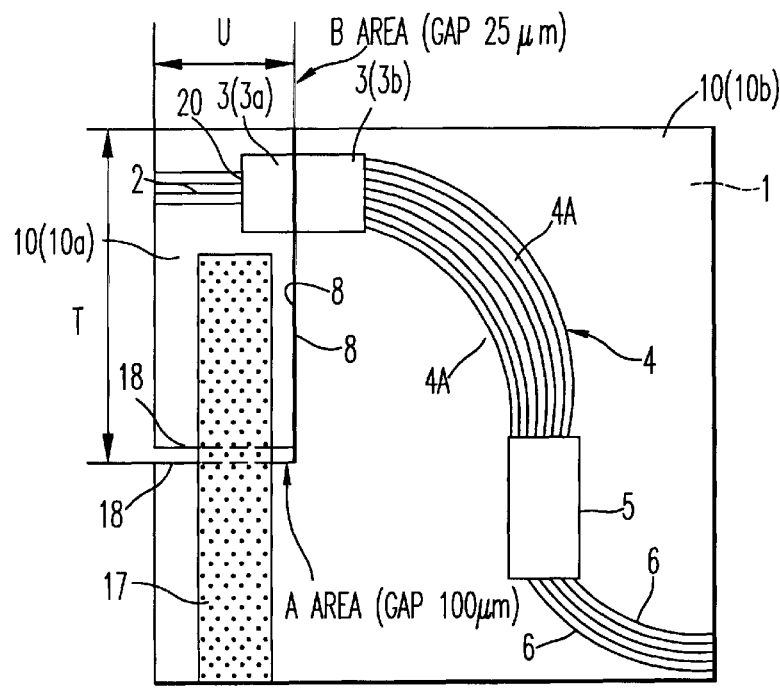
FIG. 8C    FIG. 8D

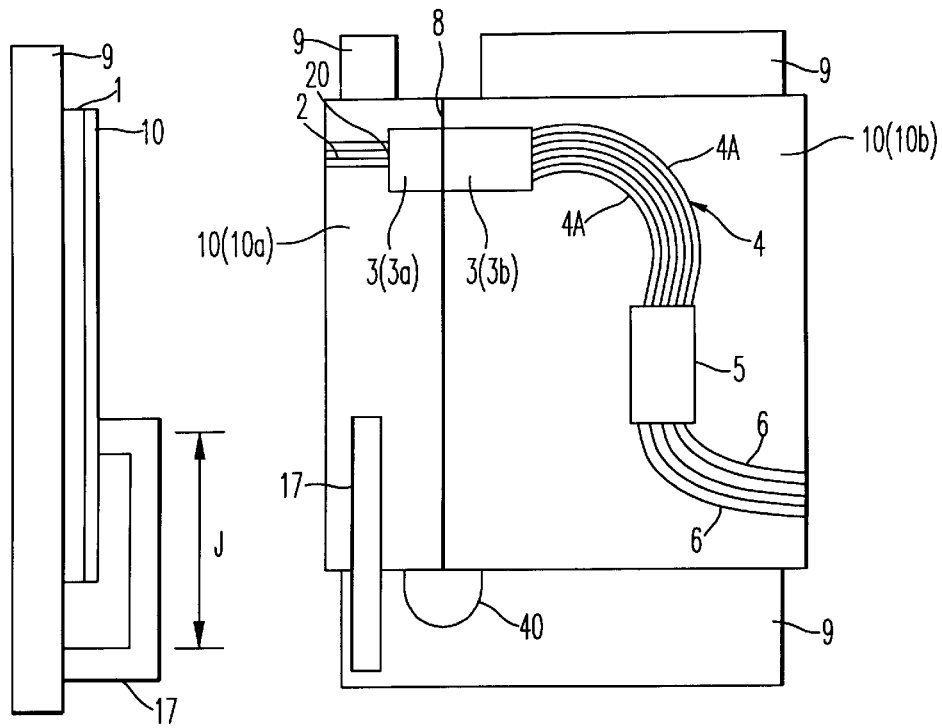
*FIG. 12A*  *FIG. 12B*
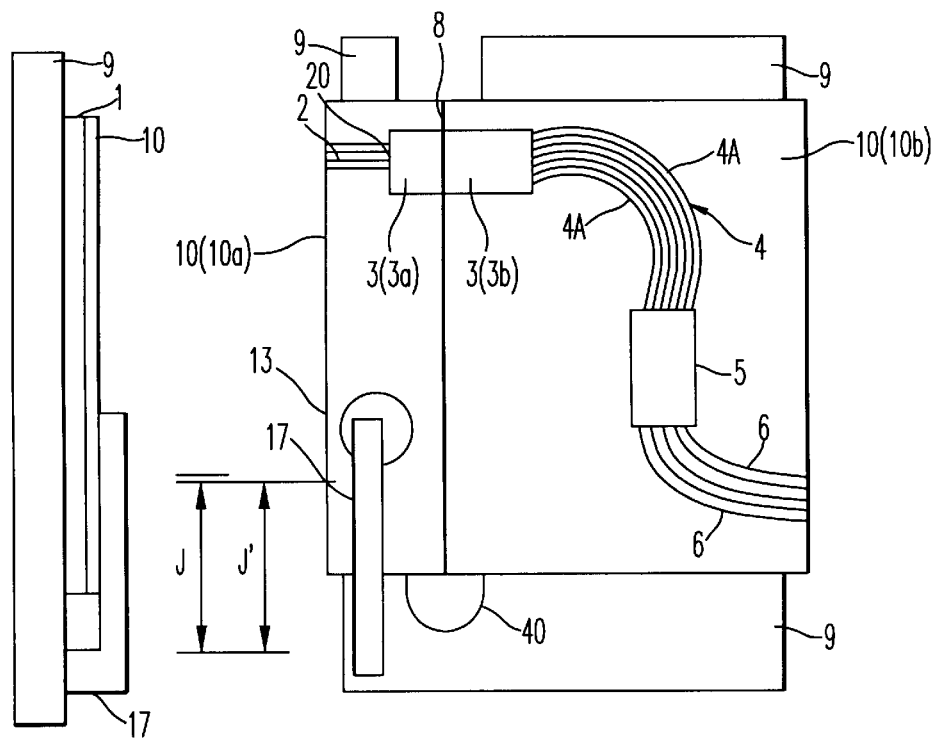
*FIG. 12C*  *FIG. 12D*

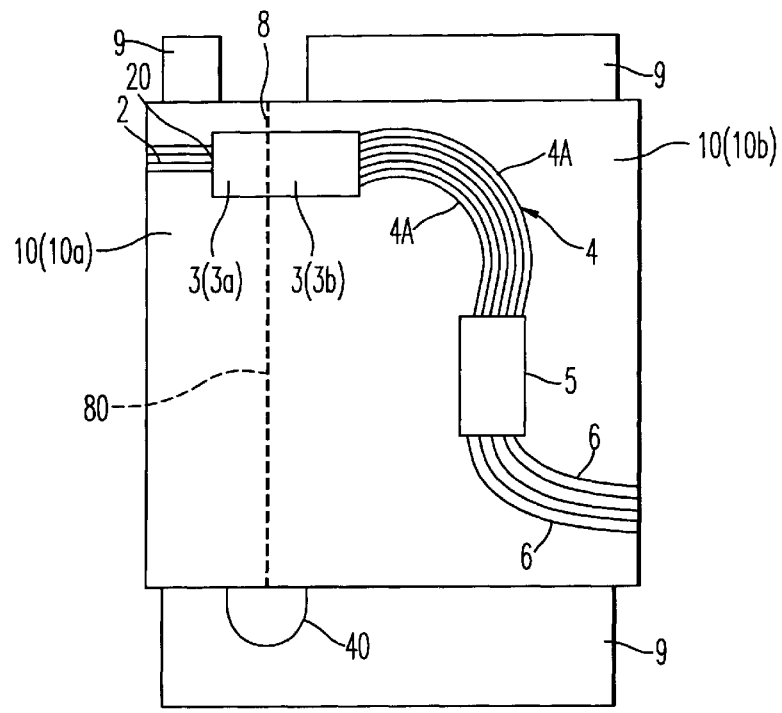
*FIG. 13A*
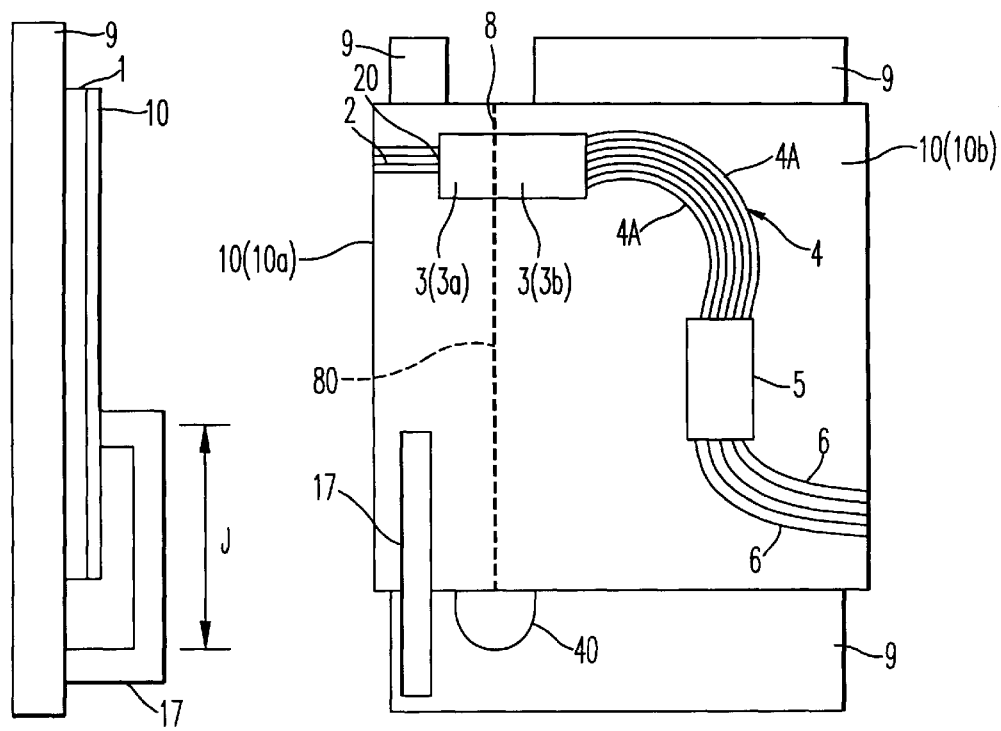
*FIG. 13B*  *FIG. 13C*

ARRAYED WAVEGUIDE GRATING TYPE OPTICAL MULTIPLEXER/DEMULTIPLEXER AND A METHOD OF MANUFACTURING THE SAME

CROSS-REFERENCES TO RELATED DOCUMENTS

The present document is related to and claims priority on Japanese Priority Documents 11-370,457, filed on Dec. 27, 1999, and 2000-176,691, filed on Jun. 13, 2000, the contents of both of which are hereby incorporated herein by reference.

BACKGROUND OF THE INVENTION

1. Field of the Invention

The present invention relates to an arrayed waveguide grating type optical multiplexer/demultiplexer used as an optical multiplexer/demultiplexer in, for example, wavelength division multiplexing optical communications, and to a method of manufacturing the same.

2. Discussion of the Background

Recently, in optical communications research and development of optical wavelength division multiplexing communications has actively been pursued as a way to exponentially increase transmission volume, and the results are being put into practice. Optical wavelength division multiplexing communications uses, for example, a technique of division multiplexing a plurality of light beams each having a different wavelength from one another to transmit them. For systems using such optical wavelength division multiplexing communications, a light transmissive device or the like is provided to enable the receiver of the optical communication to take out light beams separately on the basis of their wavelengths from the transmitted light beams that have undergone the wavelength division multiplexing. The light transmissive device only transmits light of certain given wavelengths.

Examples of the light transmissive device include an arrayed waveguide grating (AWG) including a planar lightwave circuit (PLC) such as shown in FIG. 15. The arrayed waveguide grating has a waveguide forming region 10 formed from quartz-based glass on a substrate 1 made of silicon or the like. The waveguide forming region 10 has a waveguide structure as illustrated in FIG. 15 and formed from a core.

The waveguide structure of the arrayed waveguide grating includes one or more optical input waveguides 2 arranged side by side, a first slab waveguide 3 connected to the output ends of the optical input waveguides 2, an arrayed waveguide 4 connected to the output end of the first slab waveguide 3, a second slab waveguide 5 connected to the output end of the arrayed waveguide 3, and a plurality of optical output waveguides 6 arranged side by side and connected to the output end of the second slab waveguide 5. The size of the arrayed waveguide grating can be set, for example, such that A=B=40 mm.

The arrayed waveguide 4 propagates light output from the first slab waveguide 3, and includes a plurality of channel waveguides 4a arranged side by side. Lengths of adjacent channel waveguides 4a are different from each other with the differences (ΔL) preset. The number of optical output waveguides 6 is determined, for example, in accordance with how many light beams having different wavelengths from one another are to be created as a result of demultiplexing or multiplexing of signal light by the arrayed waveguide grating. The channel waveguides 4a constituting the arrayed waveguide 4 are usually provided in a large number, for example 100. However, FIG. 15 is simplified and the number of the channel waveguides 4a, the optical output waveguides 6, and the optical input waveguides 2 in FIG. 15 does not reflect the actual number thereof.

The optical input waveguides 2 are connected to, for example, transmission side optical fibers (not shown), so that light having undergone the wavelength division multiplexing is introduced to the optical input waveguides 2. The light output from the optical input waveguides 2 is introduced to the first slab waveguide 3, is diffracted by the diffraction effect thereof, and enters the arrayed waveguide 4 to travel along the arrayed waveguide 4.

After traveling through the arrayed waveguide 4, the light reaches the second slab waveguide 5 and then is condensed in the optical output waveguides 6 to be output therefrom. Because of the preset differences in lengths between adjacent channel waveguides 4a of the arrayed waveguides 4, light beams after traveling through the arrayed waveguides 4 have different phases from one another. The phase front of many light beams from the arrayed waveguide 4 is tilted in accordance with the differences and the position where the light is condensed is determined by the angle of this tilt.

Therefore, light beams having different wavelengths are condensed at different positions from one another. By forming the optical output waveguides 6 at these positions, light beams $\lambda_1, \lambda_2, \ldots \lambda_n$ having different wavelengths can be output from the respective optical output waveguides 6 provided for the respective wavelengths.

In other words, the arrayed waveguide grating has an optical multiplexing/demultiplexing function. With this function, the arrayed waveguide grating can demultiplex light input from the optical input waveguides 2, which has previously undergone the division multiplexing and possesses different wavelengths from one another, into light beams of one or more wavelengths, and then output the light beams from their respective optical output waveguides 6. The central wavelength of light to be demultiplexed is in proportion to the differences (ΔL) in lengths of adjacent channel waveguides 4a constituting the arrayed waveguide 4 and to the effective refractive index $n_e$ of the channel waveguides 4a.

Having the characteristics as above, the arrayed waveguide grating can be used as a light transmissive device for optical multiplexing/demultiplexing applied to a wavelength division multiplexing transmission system. For instance, as shown in FIG. 15, light beams which have undergone wavelength division multiplexing and having wavelengths of λ1, λ2, λ3, . . . λn (n is an integer equal to or larger than 2), respectively, are input to one of the optical input waveguides 2. The light beams are diffracted in the first slab waveguides 3, reach the arrayed waveguides 4, and travel through the arrayed waveguides 4 and the second slab waveguides 5. Then, as described above, the light beams are respectively condensed at different positions determined by their wavelengths, enter different optical output waveguides 6, travel along their respective optical output waveguides 6, and are output from the output ends of the optical output waveguides 6.

The light beams having different wavelengths can then be further taken out through optical fibers for outputting light (not shown) that are connected to the output ends of the optical output waveguides 6. When connecting the optical fibers to the optical output waveguides 6 and to the optical input waveguides 2, an optical fiber array is prepared for each. In the optical fiber array, connection terminal faces of the optical fibers are arranged and fixed into a one-dimensional array. The optical fiber array is fixed to the connection terminal faces of the optical output waveguides 6 or to the optical input waveguides 2 to thereby connect the optical fibers to the optical output waveguides 6 or to the optical input waveguides 2.

The above arrayed waveguide grating has such light transmission characteristics (wavelength characteristics of transmission light intensity in the arrayed waveguide grating) of light beams output from the optical output waveguides 6 such that with the respective light transmission central wavelengths (e.g., $\lambda 1, \lambda 2, \lambda 3, \ldots \lambda n$) as the center, the light transmittance of the output light beams becomes smaller as the wavelength deviates from their respective light transmission central wavelength.

Every light transmission central wavelength $\lambda_o$ is determined by the effective refractive index $n_e$ of the arrayed waveguide 4, the difference ($\Delta L$) in length of adjacent channel waveguides 4a of the arrayed waveguide 4, and diffraction order m, and is expressed by the following numerical expression (1).

$$\lambda_o = n_e \cdot \Delta L / m \tag{1}$$

Therefore, the wavelength indicative of the light transmission characteristics with regard to one of the optical output waveguide 6 is not always one, but there may be plural central wavelengths depending on the diffraction order set thereto. It is possible to demultiplex light into a plurality of optical signals having a certain wavelength interval $\Delta \lambda$ (nm) with the light transmission central wavelength $\lambda_o$ as the center. Accordingly, only the central wavelength $\lambda_o$ is considered in the discussion below.

The arrayed waveguide grating utilizes the principle of reciprocity (reversibility) of an optical circuit and, hence, has the function of an optical multiplexer as well as the function of an optical demultiplexer. That is, in a manner reverse to that already discussed with respect to FIG. 15, a plurality of light beams having different wavelengths from one another may be input to respective optical output waveguides 6. The input light beams travel along propagation routes opposite to the routes discussed above with respect to FIG. 15, are multiplexed in the arrayed waveguide 4 and in the first slab waveguide 3, and then are output from one of the optical input waveguides 2.

In such an arrayed waveguide grating as mentioned above, the wavelength resolution of the grating is in proportion to the difference in lengths ($\Delta L$) between the channel waveguides 4a of the arrayed waveguides 4, which are one of the components of the grating. When the arrayed waveguide grating is designed to have a large $\Delta L$, it is theoretically possible to multiplex/demultiplex light to accomplish wavelength division multiplexing with a narrow wavelength interval. It is thus theoretically possible for the arrayed waveguide grating to have a function of multiplexing/demultiplexing a plurality of signal light beams, specifically, a function of demultiplexing or multiplexing a plurality of optical signals with a wavelength interval of 1 nm or less, which is a function deemed necessary for optical wavelength division multiplexing communications of high density.

To manufacture an arrayed waveguide grating as discussed above, for example, first flame hydrolysis deposition is used to form an under cladding layer and a core layer on a silicon substrate, then a photomask is prepared on which the waveguide structure of the arrayed waveguide grating is drawn, a transfer is performed by photolithography through the photomask, the arrayed waveguide grating pattern is transferred onto the core layer by reactive ion etching, and then flame hydrolysis deposition is again used to form an over cladding layer. The arrayed waveguide grating is thus manufactured.

The arrayed waveguide grating of FIG. 15 is conventionally formed with a quartz-based glass material as a main component, and due to temperature dependency of this quartz-based glass material, the light transmission central wavelength $\lambda_o$ of the arrayed waveguide grating shifts depending on the temperature. This temperature dependency extends to so great a degree that, for instance, when the change in temperature is 50° C. or more in an arrayed waveguide grating designed and manufactured using setting values generally used in the background art, the light transmission central wavelength shifts by 0.5 nm or more. The value 0.5 nm is fatal to an arrayed waveguide grating desired to demultiplex or multiplex light with a very narrow wavelength interval of 1 nm or less.

SUMMARY OF THE INVENTION

The present inventors therefore believe that there is a great importance in realizing an arrayed waveguide grating type optical multiplexer/demultiplexer that can control the temperature dependency of the light transmission central wavelength. According to the view of the present inventors, easiness in manufacturing the arrayed waveguide grating type optical multiplexer/demultiplexer and smallness of insertion loss are also objects significant in putting into practice an arrayed waveguide grating type optical multiplexer/demultiplexer as a device for wavelength division multiplexing communications.

The present invention has been made in order to address the problems noted above, and an object of the present invention is therefore to provide an arrayed waveguide grating type optical multiplexer/demultiplexer that is easy to manufacture, can reduce temperature dependency of a light transmission central wavelength, and can reduce insertion loss, and to provide a method of manufacturing the same.

To achieve the above and other objects, in an arrayed waveguide grating type optical multiplexer/demultiplexer of the present invention, a slab waveguide is divided into two by intersecting planes that intersect the route of the light traveling along the slab waveguide. The intersecting planes serve as dividing planes and divide a waveguide forming region into a first waveguide forming region that includes one portion of the divided slab waveguide and a second waveguide forming region that includes the other portion of the divided slab waveguide. One or both of the first waveguide forming region and the second waveguide forming region are moved along the dividing planes by a position shifting member. Therefore it is possible to compensate, with the use of the movement by the position shifting member, shifts in light transmission central wavelengths of the arrayed waveguide grating which is caused by, for example, the temperature change of the arrayed waveguide grating.

In the arrayed waveguide grating type optical multiplexer/demultiplexer according to the present invention, when the position shifting member is arranged such that its one end is secured on the first waveguide forming region and its other end is secured on the second waveguide forming region, the structure of the device is simplified and precision is improved. Furthermore, the cost of the device is reduced and the yield thereof is increased.

Further to achieve the above and other objects, in the method of manufacturing an arrayed waveguide grating type optical multiplexer/demultiplexer of the present invention, at least one slab waveguide is divided into two by intersecting planes that intersect the route of light traveling along the slab waveguide. The waveguide forming region is divided by the dividing planes into the first waveguide forming region that includes one portion of the divided slab waveguide and a second waveguide forming region that includes the other portion of the divided slab waveguide. A position shifting member with a function of moving one or both of the first and second waveguide forming regions along the dividing planes is fixed before the division such that the position shifting member secures its one end on the first waveguide forming region and secures its other end on the second waveguide forming region. Therefore, the relative positions of the first waveguide forming region and the second waveguide forming region before the division are almost the same as those after the division.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 1A and 1B are structural diagrams showing the structure of the main part of a first embodiment of an arrayed waveguide grating type optical multiplexer/demultiplexer according to the present invention, in which FIG. 1A is a plan view thereof and FIG. 1B is a side view thereof;

FIGS. 6A and 6B are structural diagrams schematically showing a second embodiment of an arrayed waveguide grating type optical multiplexer/demultiplexer according to the present invention, in which FIG. 6A is a plan view thereof and FIG. 6B is a side view thereof;

FIGS. 8A to 8D are explanatory diagrams illustrating steps of manufacturing the arrayed waveguide grating type optical multiplexer/demultiplexer in the second embodiment subsequent to the steps shown in FIGS. 7A and 7B, in which FIGS. 8A and 8C are side views and FIGS. 8B and 8D are plan views;

FIGS. 11A to 11D are explanatory diagrams illustrating a part of steps of manufacturing the arrayed waveguide grating type optical multiplexer/demultiplexer of the third embodiment, in which FIG. 11A is a plan view and FIGS. 11B to 11D are side views;

FIGS. 12A to 12D are explanatory diagrams showing the structure of the main part of a fourth embodiment of an arrayed waveguide grating type optical multiplexer/demultiplexer according to the present invention, in which FIGS. 12A and 12C are side views thereof and FIGS. 12B and 12D are plan views thereof;

FIGS. 13A to 13C are explanatory diagrams illustrating a part of steps of manufacturing the arrayed waveguide grating type optical multiplexer/demultiplexer in the fourth embodiment, in which FIGS. 13A and 13C are plan views thereof and FIG. 13B is a side view thereof;

FIGS. 14A and 14B are diagrams showing an arrayed waveguide grating type optical multiplexer/demultiplexer having a waveguide forming region with through holes, in which FIG. 14A is an explanatory plan view thereof and FIG. 14B is an explanatory sectional view showing the structure of the through holes.

DETAILED DESCRIPTION OF THE PREFERRED EMBODIMENTS

Embodiments of the present invention will be described below with reference to the drawings. In the description of the embodiments, the same reference symbols are used to denote identical or corresponding parts throughout the several views, and redundant explanations thereof will not be repeated.

FIGS. 1A and 1B schematically show a first embodiment of an arrayed waveguide grating type optical multiplexer/demultiplexer according to the present invention. FIG. 1A is a plan view of the optical multiplexer/demultiplexer of this embodiment. FIG. 1B shows a side view of the same viewed from the right in FIG. 1A.

Figure 15:
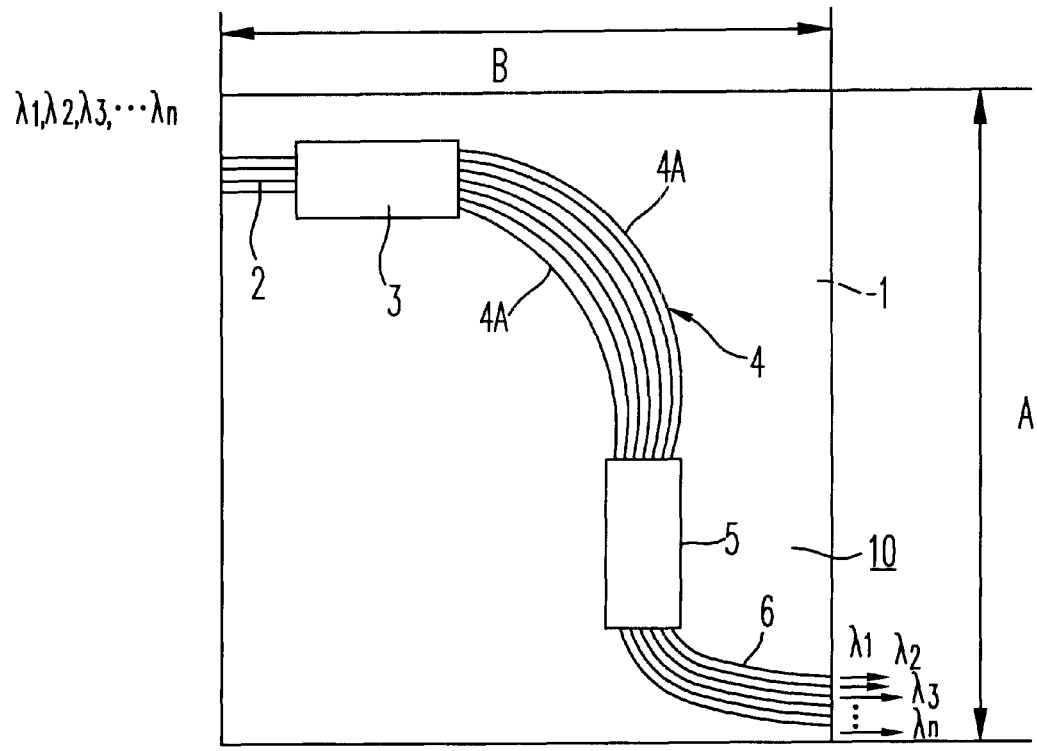
FIG. 15 is an explanatory plan view showing an arrayed waveguide grating in the background art.

As shown in FIGS. 1A and 1B, in the first embodiment, the first slab waveguide 3 of the arrayed waveguide grating having the structure illustrated in FIG. 15 is divided into two by intersecting dividing planes 8 that intersect with a route of light traveling through the first slab waveguide 3. The intersecting dividing planes 8 are provided in a waveguide forming region 10 starting from one end (upper end in FIG. 1A) of the waveguide forming region 10 and stretching to the midsection thereof. Non-intersecting dividing planes 18 that do not intersect with the first slab waveguide 3 are formed so as to connect with the intersecting dividing planes 8. The non-intersecting dividing planes 18 may be at right angles with the intersecting dividing planes 8, although that is not a requirement.

In this first embodiment, the intersecting dividing planes 8 and the non-intersecting dividing planes 18 divide the waveguide forming region 10 into (1) a first waveguide forming region 10a that includes a divided slab waveguide 3a on one side and (2) a second waveguide forming region 10b that includes a divided slab waveguide 3b on the other side.

A position shifting member 17 with a thermal expansion coefficient larger than that of the waveguide forming region 10 is provided so as to be secured in the first waveguide forming region 10a at its one end and to be secured in the second waveguide forming region 10b at its other end. The position shifting member 17 expands and contracts to slide the first waveguide forming region 10a along the intersecting dividing planes 8 with respect to the second waveguide forming region 10b.

The position shifting member 17 in this embodiment is placed in a manner that allows the position shifting member 17 to secure its one end on the front side of the waveguide forming region 10a and its other end on the front side of the waveguide forming region 10b. This arrangement prohibits the waveguide forming region 10a from being displaced upward (in the direction of the Z axis perpendicular to the X-Y plane) with respect to a base 9, when sliding the waveguide forming region 10a.

The position shifting member 17 is formed from, for example, a copper plate having a thermal expansion coefficient of $1.65 \times 10^{-5}$ (1/K). Beneath the position shifting member 17, solder 30 is provided in each fixing site $29_1$, $29_2$ indicated by the oblique broken lines in FIG. 1A. The underside of each solder 30 is coated with a metal film (not shown in FIGS. 1A and 1B). One end of the position shifting member 17 is fixed at the fixing site $29_1$ to the waveguide region 10a through the metal film and the solder 30, and the other end is fixed at the other fixing site $29_2$ to the waveguide forming region 10b in the same manner.

The first waveguide forming region 10a and the second waveguide forming region 10b are divided and arranged spaced apart. For instance, the distance between the regions 10a and 10b at an area A in FIG. 1A (the distance between the non-intersecting dividing planes 18) can be about 100 μm, and the distance thereof at an area B in FIG. 1A (the distance between the intersecting dividing planes 8) can be about 25 μm.

In this first embodiment, the base 9 is provided below the substrate 1. Holes 15 are formed in attachment portions $9_1$–$9_3$ that extend outward from the edges of the base 9. Fastening members (such as screws) engaged with the holes 15 are used to fix a chip having the waveguide forming region 10 and the substrate 1 to a housing package 16 (a protective package for the arrayed waveguide grating) shown in FIG. 4. The second waveguide forming region 10b may be fixed to the base 9 by clips 19a shown in FIG. 5 as clamping members which clamp the region at two positions.

A silicon plate 35 as a position shift preventing member may also be provided in a part (shown on the upper side of FIG. 1A) of a border region between the first waveguide forming region 10a and the second waveguide forming region 10b in this embodiment. The silicon plate 35 prevents the first waveguide forming region 10a and the second waveguide forming region 10b from shifting their positions in a direction perpendicular to the plane of the substrate 1. A plate-like material having a flat surface can be used to form the silicon plate 35. The silicon plate 35 can be arranged such that its flat surface abuts with the back side of the substrate 1, and it is clamped by a clip 19b. That the silicon plate 35 is clamped by the clip 19b does not prohibit the first waveguide forming region 10a from sliding along the intersecting dividing planes 8. The clip 19b clamps the silicon plate 35 such that the position shifting member 17 can slide the first waveguide forming region 10a along the intersecting dividing planes 8 with respect to the second waveguide forming region 10b.

As discussed above, the present invention as shown in FIGS. 1A and 1B provides an operation such that the position shifting member 17 will expand and contract with changes in temperature. That position shifting is designed in the present invention to shift the two portions of the divided slab waveguide 3a to compensate for temperature induced variations in the arrayed waveguide grating. For the device of the present invention to operate properly then, it is important that the position shifting member 17 expand and contract at an appropriate rate based on the temperature changes. The position shifting of the position shifting member 17 is based largely on its material and the length J between the two fixed ends, as it is that unfixed portion of the position shifting member 17 extending along the length J which will expand and contract. As discussed below, a specific example of how to properly calculate that length J is set forth.

The arrayed waveguide grating type optical multiplexer/demultiplexer according to the first embodiment is an arrayed waveguide grating type optical multiplexer/demultiplexer that is capable of multiplexing and demultiplexing light corresponding to, e.g., sixteen waves with a frequency interval of 100 GHz, and has the following parameters. The parameters include FSR (free spectral range) set to 25.6 nm, the diffraction order m set to 59, and the difference ΔL in length between adjacent channel waveguides 4a set to 63.1 μm at a temperature of 25° C.

The parameters also include a focal length $L_f$ set to 12327.06 μm for the first and second slab waveguides 3 and 5, a pitch D of the arrayed waveguide 4 set to 20 μm, the effective refractive index $n_e$ set to 1.45115 for the arrayed waveguide 4, an arrayed waveguide group refractive index $n_g$ set to 1.47512, an effective refractive index $n_s$ set to 1.453 for the first and second slab waveguides 3 and 5, and the central wavelength $\lambda_o$ of the arrayed waveguide grating set to 1.551 μm.

Now, in this embodiment, dx is given as a moved distance of output ends 20 of the optical input waveguides 2, which output ends are moved with the movement on the side of the divided slab waveguide 3a. Since the arrayed waveguide grating type optical multiplexer/demultiplexer according to this embodiment has the above parameters, when a value representing the relation between the moved distance dx and a central wavelength shift amount dλ is calculated by the following numerical expression (2), it is 0.4 nm (central wavelength shift amount dλ)/10.21 μm (moved distance dx).

$$dx/d\lambda = (L_f \times \Delta L)/(n_s \times D \times \lambda_o) \times n_g \quad (2)$$

J is given as the length of a necessary thermal expansion coefficient utilizing region of the copper plate of the position shifting member 17 with respect to the temperature dependency 0.011 nm/° C. of the central wavelength of the arrayed waveguide grating. Then, $1.65 \times 10^{-5} \times (J \times 10^3) \times (0.4/10.21) = 0.011$ is obtained. Calculating J using this expression (the thermal expansion of the substrate 1 is ignored, for it is a small value), a calculated value $J_c$ of the length J is 17 mm, in this example.

Based on the calculated value $J_c$, various values are set to the actual length J (J shown in FIG. 1A) in this embodiment to examine what characteristics the arrayed waveguide grating type optical multiplexer/demultiplexer shows when the temperature dependency of the light transmission central wavelength ranges from 5° C. to 75° C. The present inventors have examined (1) the case in which the arrayed waveguide grating type optical multiplexer/demultiplexer is manufactured setting the J to the calculated value $J_c$ (17 mm), (2) the case in which the arrayed waveguide grating type optical multiplexer/demultiplexer is manufactured setting the J to the calculated value $J_c$+5 mm (22 mm), and (3)

the case in which the arrayed waveguide grating type optical multiplexer/demultiplexer is manufactured setting the J to the calculated value $J_c$–5 mm (12 mm).

The present inventors found from the data obtained by the above examination and representing the relation between the length J and the temperature dependency of the light transmission central wavelength that the length J should be set to 20 mm in order to make the temperature dependency coefficient of light transmission central wavelength almost 0. Accordingly, the arrayed waveguide grating is manufactured determining the length of the position shifting member 17 and positions to form the solder 30 so that the length J is set to 20. Lengths E and Q shown in FIG. 1A are 60 mm and 5 mm, respectively.

The metal film mentioned above is formed as follows (see FIG. 2A). First, a resist is applied to the front side of the waveguide forming region 10. The applied resist is exposed using a preset pattern, and is then developed to form a resist mask. Through this resist mask, a metal film 31 is formed by evaporation or sputtering in each fixing site $29_1$, $29_2$ on the front side of the waveguide forming region 10. The metal film 31 serves as a base film of the solder 30, and is provided to improve adherence of the solder 30 to the front side (glass surface) of the waveguide forming region 10. This process adopts a general semiconductor manufacturing process which utilizes photolithography and, hence, positioning of high accuracy is not hard to achieve.

Examples of films usable as the metal film 31 include a lamination film including Cr (0.1 $\mu$m) and Cu (0.5 $\mu$m) layered in this order, a lamination film including Cr (0.1 $\mu$m), Ti (0.1 $\mu$m), Pt (0.1 $\mu$m) and Au (0.6 $\mu$m) layered in this order, and a lamination film including Ti (0.1 $\mu$m), Pt (0.1 $\mu$m), and Au (0.6 $\mu$m) layered in this order.

After the metal film 31 is formed, lift-off is conducted to peel the resist mask off and remove it using a solvent. This solvent dissolves only the resist, and acetone, for example, is suitable for the solvent.

In this embodiment, matching oil matching the waveguide forming region 10 in refractive index can be provided in the space between the intersecting dividing planes 8. Furthermore, the matching oil can fill the housing package for housing the arrayed waveguide grating in this embodiment. If the housing package is not filled with the matching oil, matching grease with high viscosity may be provided instead in the space between the intersecting dividing planes 8. Such arrangements make it possible to protect the lightwave circuit module against adverse influence of moisture even in a hot and humid environment. It also prevents evaporation of the refractive index matching agent provided in the space between the intersecting dividing planes 8 of the arrayed waveguide grating. Therefore, it is possible to avoid cracking of the arrayed waveguide grating and to avoid an increase in connection loss at the intersecting dividing planes 8 due to moisture absorption in a hot and humid environment.

The first embodiment is structured as described above. Now, specific examples are given in relation to a method of manufacturing the arrayed waveguide grating type optical multiplexer/demultiplexer according to the first embodiment.

Figure 2A:
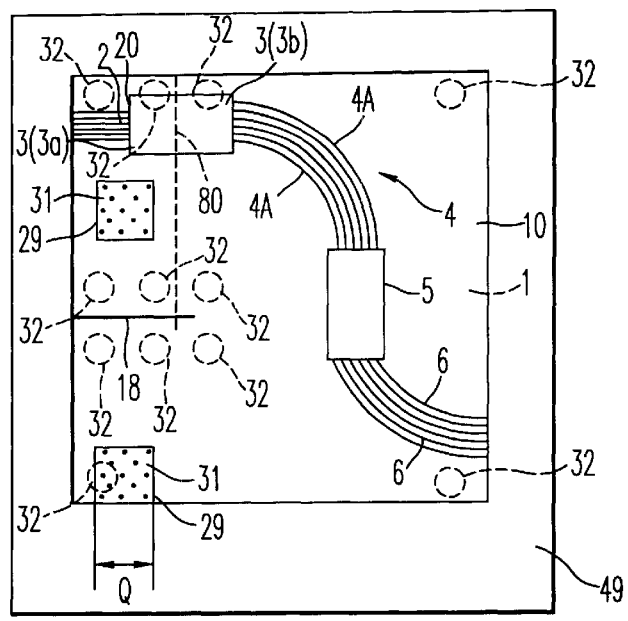
FIGS. 2A to 2C are explanatory plan views illustrating a part of steps of manufacturing the arrayed waveguide grating type optical multiplexer/demultiplexer of the first embodiment.

First, as shown in FIG. 2A, an arrayed waveguide grating (arrayed waveguide grating chip) is prepared which has the same structure as the background arrayed waveguide grating shown in FIG. 15. Dividing line 80 for forming dividing planes that include the intersecting dividing planes 8, 18 (the intersecting dividing planes 8 and the non-intersecting dividing planes 18 in this embodiment) are set in advance. The dividing planes are for dividing the waveguide forming region 10 into the first waveguide forming region 10a and the second waveguide forming region 10b.

The arrayed waveguide grating chip is cut along the line separating the non-intersecting dividing planes 18. The metal film 31 is formed in each fixing site $29_1$, $29_2$ on the front side of the arrayed waveguide grating chip. A groove is formed on the back side of the arrayed waveguide grating chip along the dividing lines 80. After that, the back side of the arrayed waveguide grating chip is temporarily fixed to a temporal fixing plate 49 made of a flat glass plate at temporal fixing areas 32.

An adhesive, e.g., Cemedine Super 5 (trade name), is applied to each of the temporal fixing areas 32 in a manner of drawing a circle with dots, so that the arrayed waveguide grating chip can later be readily peeled off the, temporal fixing plate 49. The non-intersecting dividing planes 18 are formed by cutting the arrayed waveguide grating chip by a dicing saw or the like. The width thereof is, for example, about 100 $\mu$m. As shown in FIG. 2C, a groove 38 runs along the dividing lines 80 of the intersecting dividing planes 8 and is formed on the back side of the arrayed waveguide grating chip. The groove 38 may have a width of about 300 $\mu$m and a depth of about 0.7 mm, for example.

Figure 2B:
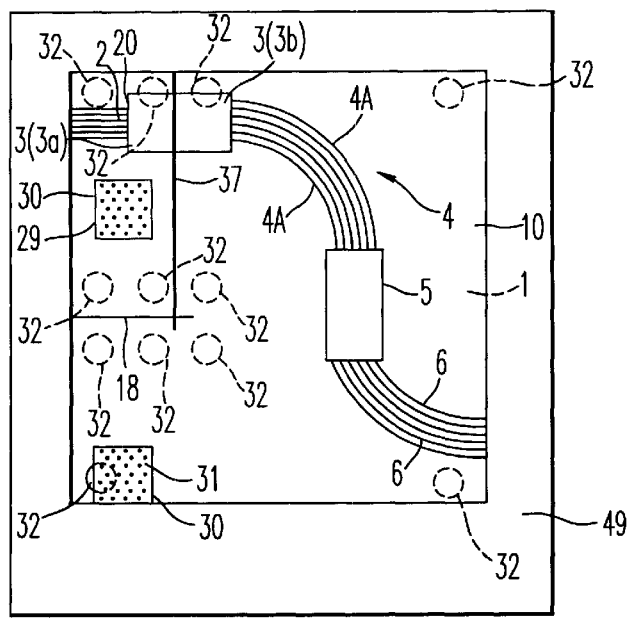
Figure 2C:
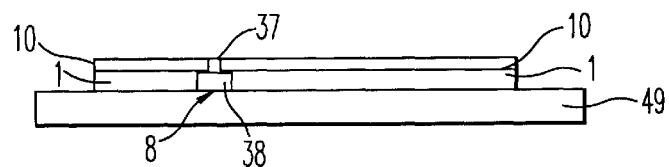

After the arrayed waveguide grating chip is temporarily fixed to the temporal fixing plate 49, a groove 37 is formed as shown in FIGS. 2B and 2C. The groove 37 runs along the dividing lines of the intersecting dividing planes 8 on the front side of the arrayed waveguide grating, and may have a width of about 20 $\mu$m. As shown in FIG. 2C, the groove 37 forms, together with the groove 38 formed on the back side of the arrayed waveguide grating, the intersecting dividing planes 8. The solder 30, e.g. of Sn/Pb (60%/40%), is then disposed on each area for forming the metal film 31.

Figure 3A:
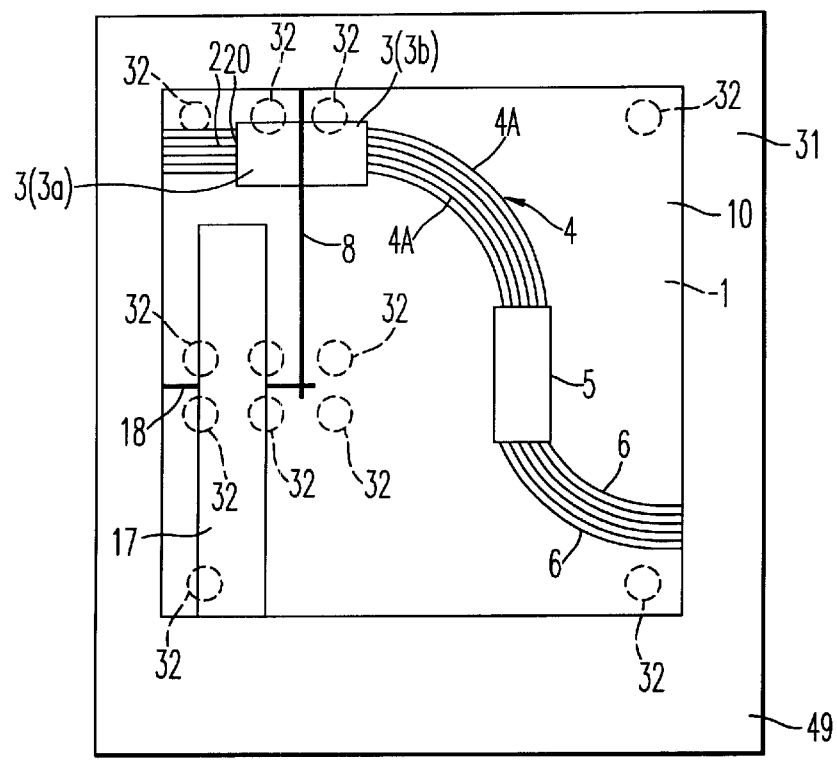
FIGS. 3A and 3B are explanatory plan views illustrating steps of manufacturing the arrayed waveguide grating type optical multiplexer/demultiplexer in the first embodiment subsequent to the steps shown in FIGS. 2A to 2C.

Thereafter, the solder 30 is melted while the position shifting member 17 made of copper plate is set in place as shown in FIG. 3A, thereby fixing the position shifting member 17 to the waveguide forming region 10 with the solder 30. The solder 30 is provided to adhere the metal film 31 tightly to the position shifting member 17. The solder 30 is melted by heating the arrayed waveguide grating up to 230° C. using, for example, a hot plate.

Figure 3B:
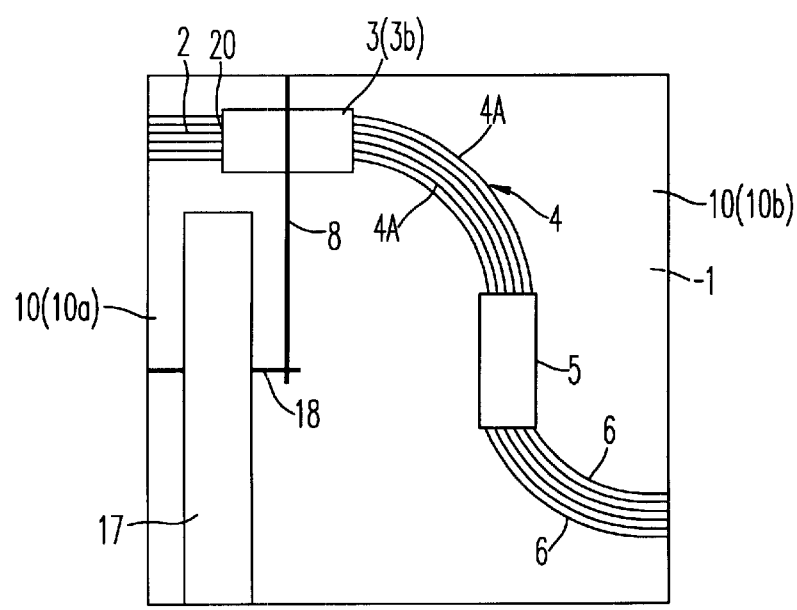

After that, the arrayed waveguide grating chip of the above structure, having been temporarily fixed to the temporal fixing plate 49, is immersed in acetone to peel it off the temporal fixing plate 49 as shown in FIG. 3B. The waveguide forming region 10 is at this time divided into the first waveguide forming region 10a and the second waveguide forming region 10b by the intersecting dividing planes 8 and the non-intersecting dividing planes 18.

Optical fiber arrays 21 and 22 (FIG. 1A) next are connected to the arrayed waveguide grating. Optical fibers 23 and 24 (FIG. 4) are provided in the optical fiber arrays 21 and 22, respectively. The optical fibers 23 and 24 are aligned so that cores thereof are bonded to cores of the optical input waveguides 2 of the arrayed waveguide grating and of the optical output waveguides 6 of the same, respectively. In this first embodiment, the clips 19a fix the waveguide forming region 10b and the substrate 1 underneath thereof to the base 9. The silicon plate 35 is arranged so as to abut with the back side of the border region (back side of the substrate 1) between the first waveguide forming region 10a and the second waveguide forming region 10b. The clip 19b fixes the silicon plate 35 such that the first waveguide forming region 10a can be slid. The silicon plate 35 may be provided on the back side of the waveguide forming region 10 or on the front side of the waveguide forming region 10.

Figure 4:
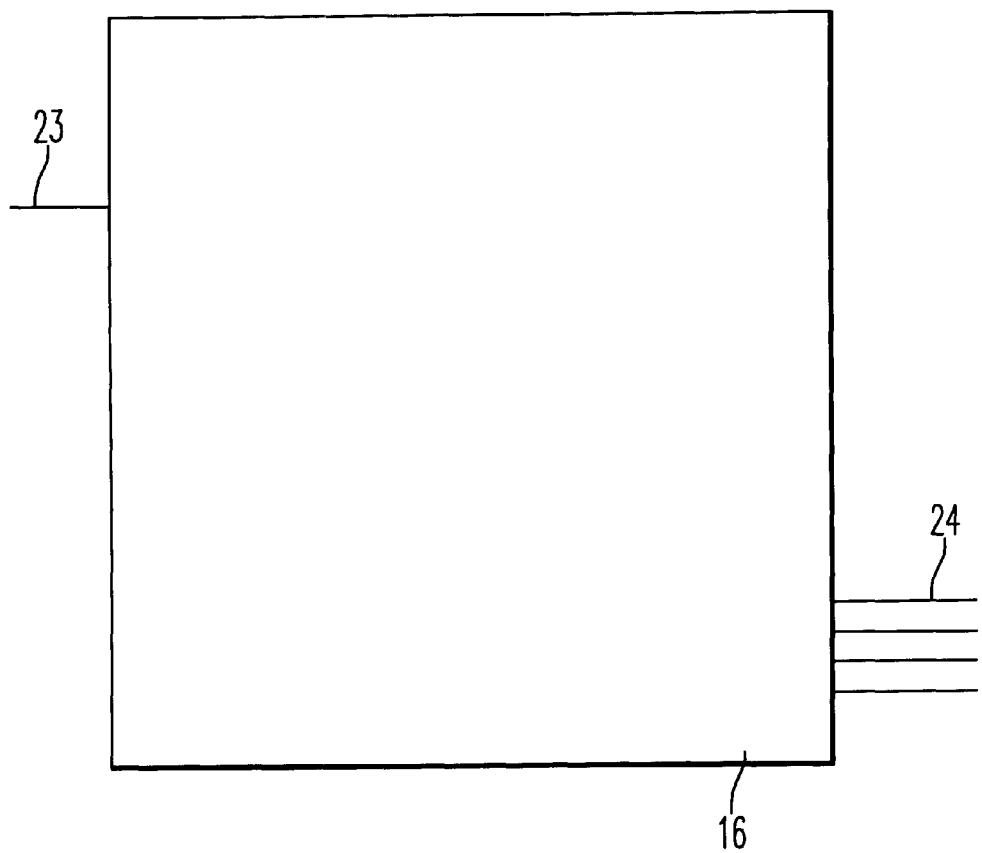
FIG. 4 is an explanatory plan view showing the appearance of the arrayed waveguide grating type optical multiplexer/demultiplexer in the first embodiment.
Figure 5:
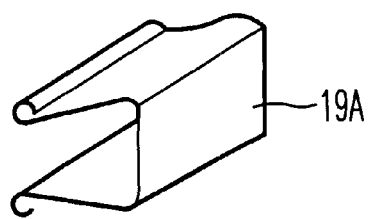
FIG. 5 is a perspective view showing a clip utilized in the first embodiment.

The arrayed waveguide grating type optical multiplexer/demultiplexer is housed in the housing package 16 as shown in FIG. 4. The arrayed waveguide grating is fixed to the housing package 16 using the holes 15 of the base 9. Thereafter, the housing package 16 is filled with the matching oil and is sealed tightly.

According to the first embodiment, the position shifting member 17 slides the first waveguide forming region 10a along the intersecting dividing planes 8 with changes in the temperature. This sliding compensates for the temperature dependency of the light transmission central wavelengths of the arrayed waveguide grating. Moreover, the position shifting mechanism is composed of the position shifting member 17 being arranged so as to place its one end on the first waveguide forming region 10a and the other end on the second waveguide forming region 10b, simplifying the overall structure of the device. The cost of the device is accordingly reduced and the production yield thereof is improved.

This first embodiment adopts the above manufacturing method. According to the manufacturing method, the dividing lines 80 for dividing the waveguide forming region 10 into the first waveguide forming region 10a and the second waveguide forming region 10b are set in advance. The position shifting member 17 is fixed so as to be secured in the first waveguide forming region 10a at its one end and in the second waveguide forming region 10b at its the other end. The waveguide forming region 10 is then divided into the first waveguide forming region 10a and the second waveguide forming region 10b along the dividing lines 80 by peeling it off the temporal fixing plate 49. Therefore, the relative positions of the first waveguide forming region 10a and the second waveguide forming region 10b in the Y direction are the same before and after the division. According to this embodiment, the light transmission characteristics before the division of the arrayed waveguide grating chip thus can be maintained after the division takes place, reducing the insertion loss.

The present inventors have examined the arrayed waveguide grating type optical multiplexer/demultiplexer of the first embodiment to evaluate whether any increase in insertion loss results when the temperature of the arrayed waveguide grating changes from 5° C. to 75° C. arises. As a result of that examination, the insertion loss was found to increase by 0.2 dB, which can be deemed as almost no increase.

According to this first embodiment, the position shifting member 17 is fixed to the front side of the waveguide forming region 10 through the metal film 31 and the solder 30. Therefore, unlike a case in which an adhesive is used to fix the position shifting member 17 to the waveguide forming region 10, the solder 30 will not run outside of the designed pattern but will be contained within, and the position shifting member 17 can be fixed to the waveguide forming region 10 exactly as designed. This makes it possible to manufacture an arrayed waveguide grating high in compensation accuracy of the temperature dependency of the light transmission central wavelengths of the arrayed waveguide grating.

Moreover, the clips 19a clamp the second waveguide forming region 10b and the substrate 1. underneath thereof in this first embodiment. The second waveguide forming region 10b therefore is hardly influenced by the thermal expansion of the base 9, making it possible to more accurately slide the waveguide forming region 10a with respect to the waveguide forming region 10b. This eliminates the temperature dependency of the light transmission central wavelengths of the arrayed waveguide grating.

In this first embodiment, matching oil may be provided in the space between the intersecting dividing planes 8, and the arrayed waveguide grating is housed in the housing package 16 filled with the matching oil. Therefore, as described above, an excellent optical multiplexer/demultiplexer can be manufactured which can avoid an increase in insertion loss even in a hot and humid environment. It is also possible to surely prevent cracking of the arrayed waveguide grating due to moisture absorption from taking place even if it is an arrayed waveguide grating inferior in moisture resistant characteristics.

FIGS. 6A and 6B show the structure of the main part of a second embodiment of an arrayed waveguide grating type optical multiplexer/demultiplexer according to the present invention. FIG. 6A is a plan view of the optical multiplexer/demultiplexer of this embodiment. FIG. 6B is a side view thereof viewed from the right in FIG. 6A, without the optical fibers 24 and the optical fiber array 22.

The second embodiment is structured in almost the same way as the first embodiment. However, the second embodiment differs from the first embodiment in that it omits the silicon plate 35 in the border region between the first waveguide forming region 10a and the second waveguide forming region 10b of the first embodiment.

The position shifting member 17 in the second embodiment has a groove 50 formed so as to coincide with the non-intersecting dividing planes 18. An example of a method of manufacturing the arrayed waveguide grating type optical multiplexer/demultiplexer according to the second embodiment is shown in FIGS. 7A to 8D.

Dimensions E to U shown in FIGS. 6A to 8D are, for example, as follows in the second embodiment: E=60 mm, F=1 mm, G=2.5 mm, H=K=5 mm, J=20 mm, P=30 mm, Q=5 mm, R=5 mm, S=1 mm, T=25 mm, and U=10 mm.

Figure 7A:
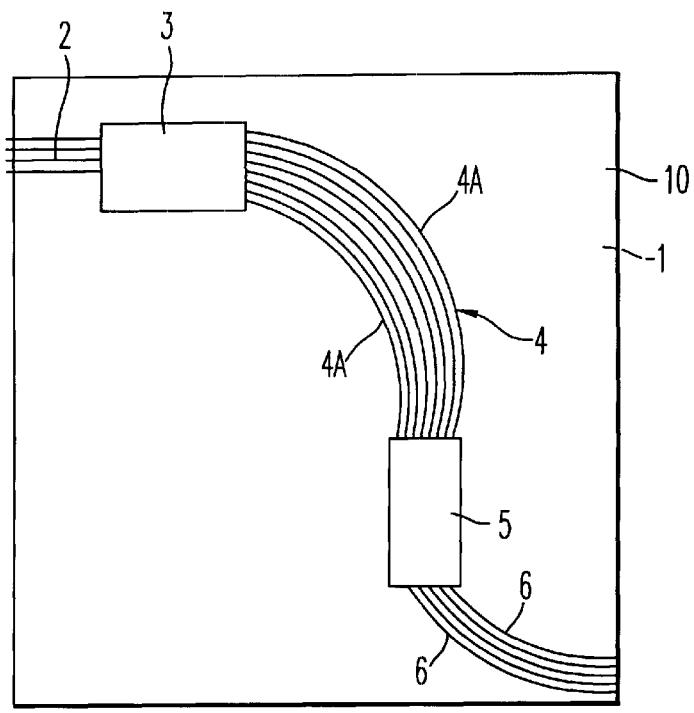
FIGS. 7A and 7B are explanatory plan views illustrating a part of steps of manufacturing the arrayed waveguide grating type optical multiplexer/demultiplexer of the second embodiment.
Figure 7B:
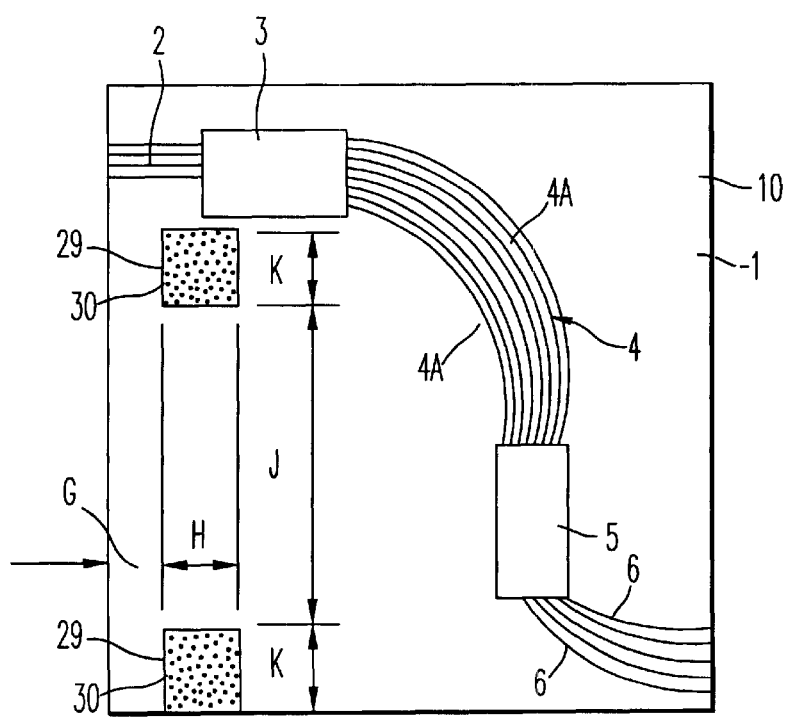

In manufacturing the arrayed waveguide grating type optical multiplexer/demultiplexer of the second embodiment, an arrayed waveguide grating chip as shown in FIG. 7A is prepared. The dividing lines 80 (not shown) are set in this chip in a manner similar as in the first embodiment, and the metal film 31 (not shown in FIG. 7A) is formed thereon for each end of the position shifting member 17. The solder 30 is then formed on each metal film 31 as shown in FIG. 7B.

Thereafter, as shown in FIGS. 8A and 8B, the position shifting member 17 is fixed with solder so as to place its one end on the first waveguide forming region 10a and the other end on the second waveguide forming region 10b.

As shown in FIGS. 8C and 8D, a plate is selected such that the distance between the waveguide forming region 10a and the waveguide forming region 10b in the intersecting dividing planes 8 (the distance between the intersecting dividing planes 8) is about 25 $\mu$m, and the distance between the waveguide forming region 10a and the waveguide forming region 10b in the non-intersecting dividing planes 18 (the distance between the non-intersecting dividing planes 18) is about 100 $\mu$m. The chip is cut along the dividing lines 80 by a dicing saw or the like, thereby forming the intersecting dividing planes 8 and the non-intersecting dividing planes 18 and dividing the waveguide forming region 10 into the first waveguide forming region 10a and the second waveguide forming region 10b.

In the case in which an arrayed waveguide grating type optical multiplexer/demultiplexer is manufactured by such a manufacturing method, a crack may take place starting from the tip of the division in forming the intersecting dividing planes 8 and the non-intersecting dividing planes 18. However, the crack can be avoided completely if, as in the first embodiment, the arrayed waveguide grating is temporarily fixed to the temporal fixing plate 49 while forming the intersecting dividing planes 8 and then the waveguide forming region 10 is divided into the first waveguide forming region 10*a* and the second waveguide forming region 10*b*.

The groove 50 is formed in the position shifting member 17 in the second embodiment. However, the groove 50 is not always required to be formed and it may be omitted. The groove 50 facilitates the work of cutting the waveguide forming region 10 and the substrate 1 using a dicing saw or the like after the position shifting member 17 is fixed with solder.

The second embodiment is structured as above, and has almost the same effect as in the first embodiment.

Since the second embodiment omits the silicon plate 35 that is provided in the first embodiment, it is somewhat less effective in preventing the first and second waveguide forming regions 10*a* and 10*b* from shifting their positions in a direction perpendicular to the plane of the substrate 1 as compared with the first embodiment. However, the second embodiment provides the above preventive effect regarding the position shifting by arranging the position shifting member 17 such that its one end is secured on the first waveguide forming region 10*a* and its other end is secured on the second waveguide forming region 10*b*. The second embodiment has been found by the inventors to be successful in limiting an increase in insertion loss when the temperature of the arrayed waveguide grating changes from 5° C. to 75° C. to 0.8 dB.

Figure 9:
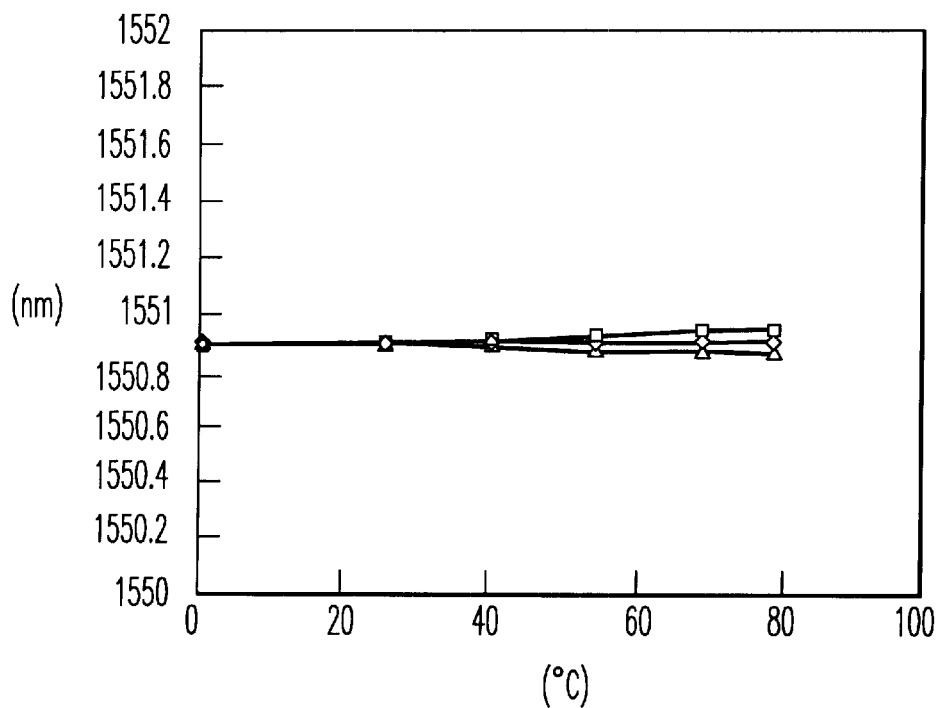
FIG. 9 is a graph showing temperature dependency characteristic of light output from one optical output waveguide of the arrayed waveguide grating type optical multiplexer/demultiplexer in the first and second embodiments.

By manufacturing three arrayed waveguide grating type optical multiplexer/demultiplexers of the second embodiment, the present inventors examined the temperature dependency of the light transmission central wavelengths of these optical multiplexers/demultiplexers. FIG. 9 shows the results thereof. It is confirmed by FIG. 9 that the arrayed waveguide grating type optical multiplexer/demultiplexers of the second embodiment are optical multiplexers/demultiplexers independent of temperature in which almost no temperature dependency of light transmission wavelengths can be found.

Figure 10:
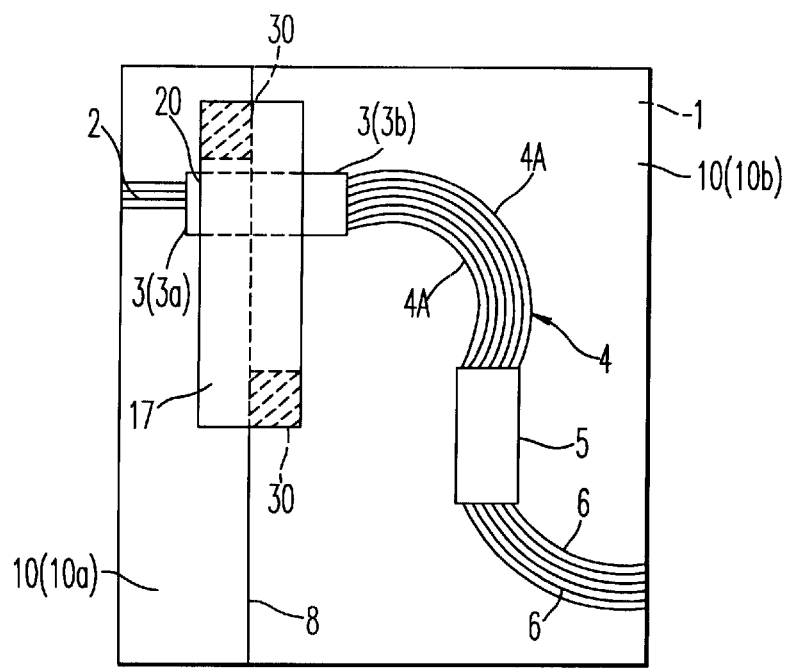
FIG. 10 is a structural diagram showing in plan view the structure of the main part of a third embodiment of an arrayed waveguide grating type optical multiplexer/demultiplexer according to the present invention.

FIG. 10 shows the structure of the main part of a third embodiment of an arrayed waveguide grating type optical multiplexer/demultiplexer according to the present invention. The third embodiment is structured in almost the same way as the first embodiment. However, the third embodiment differs from the first embodiment in that, without forming the non-intersecting dividing planes 18, only the intersecting dividing planes 8 are used to divide the waveguide forming region 10 into the first waveguide forming region 10*a* and the second waveguide forming region 10*b*, and in that the position shifting member 17 is provided on the front side of the border region between the first and second waveguide forming regions 10*a* and 10*b*.

Although not shown in FIG. 10, in the third embodiment also, the base 9 is provided and the second waveguide forming region 10*b* is fixed to the base 9 by the clips 19*a*.

Figure 11A:
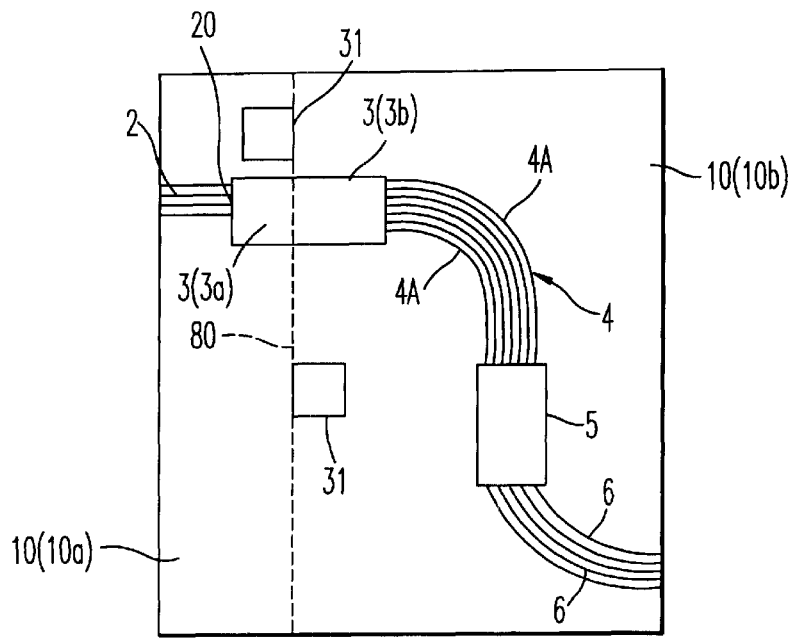
Figure 11B:
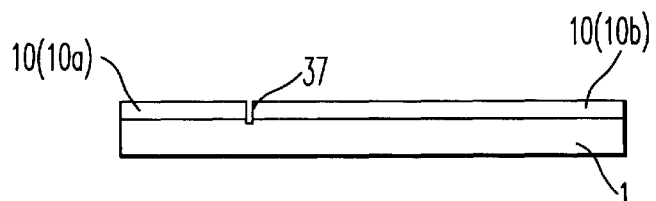
Figure 11C:
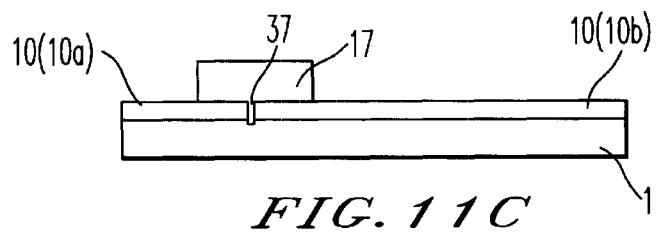
Figure 11D:
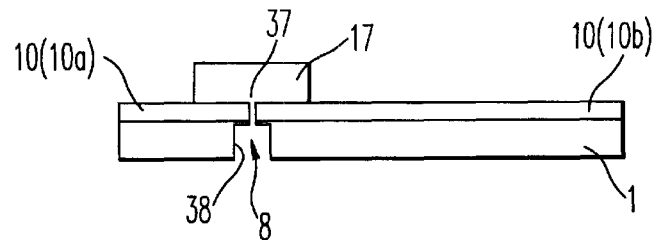

In manufacturing the arrayed waveguide grating type optical multiplexer/demultiplexer of the third embodiment, and as shown in FIG. 11A, the dividing lines 80 are set and the metal film 31 is formed for each end of the position shifting member 17. Then, as shown in FIG. 11B, a groove 37 having, e.g., a width of about 20 μm and a depth of about 0.2 mm is formed on the waveguide forming region 10. The position shifting member 17 is fixed at its respective ends to each metal film 31 on the front side of the film through solder (not shown). The position shifting member 17 is fixed in a manner that allows the position shifting member 17 to set its one end on the first waveguide forming region 10*a* and its other end on the second waveguide forming region. A groove 38 having a width of, e.g., about 300 μm is then formed on the back side of the arrayed waveguide grating chip to form the intersecting dividing planes 8.

The third embodiment also can provide the same effects as in the first embodiment, and is successful in limiting an increase in insertion loss when the temperature of the arrayed waveguide grating changes from 5° C. to 75° C. to 0.2 dB.

Note that the present invention is not limited to the above embodiments but is capable of adopting various modifications. For instance, the position shifting member 17 is disclosed as formed from a copper plate in the above discussed embodiments. However, a metal material other than copper may be used to form the position shifting member 17, and a material that is not metal but which has a thermal expansion coefficient larger than that of the waveguide forming region 10 may also be used.

The manufacturing methods adopted in the above discussed embodiments may also be modified and the metal film 31 may be formed as follows. First, the metal film 31 is formed in a region on the front side of the waveguide forming region 10, the region including areas for forming the solder 30. Then, the resist is applied thereto to conduct exposure and development using the set pattern, namely, photolithography. The metal film 31 is removed by etching (reactive ion etching or wet etching), leaving only the areas for forming the solder 30. The resist is then removed by immersing it in the solvent mentioned above or in oxygen plasma.

If the metal film 31 is formed by this method, similar to the manufacturing methods adopted in the above discussed embodiments, the metal film 31 can be formed precisely in the areas for forming the solder 30 of the preset pattern on the front side of the waveguide forming region 10. After that, a solder chip having almost the same size as the size of the metal film 31 is placed on each metal film 31 in the same manner as in the above discussed embodiments. The position shifting member 17 is thus fixed to the waveguide forming region 10 with solder. The rest of the process follows the manufacturing methods of the foregoing embodiments. The arrayed waveguide grating type optical multiplexer/demultiplexer manufactured in this way has the same effect as in the arrayed waveguide grating type optical multiplexer/demultiplexers of the above embodiments. The solder 30 used for solder fixing may be fixed to the entire face of the metal film 31. There is no inconvenience if the solder 30 is not completely contained within the regions of metal film 31.

The material of the solder 30 used for solder fixing of the position shifting member 17 in the arrayed waveguide grating type optical multiplexer/demultiplexer according to the present invention is not limited to the ones mentioned in the preceding embodiments, but is suitably chosen.

The position shifting member 17 is provided on the front side of the waveguide forming region 10 in the above discussed embodiments. However, the position shifting member 17 may be provided on the back side of the substrate 1.

The arrayed waveguide grating is formed utilizing the reciprocity of the optical circuit. Therefore, although it is the first slab waveguide 3 that is divided into two in the above discussed embodiments, the second slab waveguide 5 may be divided instead. When the second slab waveguide 5 is divided into two, one or both of the divided slab waveguides are slid by the position shifting member 17 along the intersecting dividing planes 8 in a direction that makes the temperature dependency of the light transmission central wavelengths less. This arrangement also provides the same effect as in the above discussed embodiments and eliminates the temperature dependency change of the light transmission central wavelengths.

The intersecting dividing planes 8 of the first slab waveguide 3 or of the second slab waveguide 5 are not limited to planes almost parallel to the X axis as in the above discussed embodiments. The planes may be slanted in the X axis. It is sufficient if the dividing planes intersect with a route of light traveling through the slab waveguide to be divided.

A plurality of optical input waveguides 2 are provided in the waveguide structure of the arrayed waveguide grating according to the above discussed embodiments. However, the number of optical input waveguides 2 to be provided may be one.

Although the waveguide forming region 10*b* is clamped by the clips 19*a* to be fixed to the base 9 in the above discussed embodiments, a clamping member other than the clips 19*a* may be used to fix the waveguide forming region 10*b* to the base 9. It is also possible to reverse the roles of the waveguide forming regions 10*a* and 10*b* by clamping the periphery of the waveguide forming region 10*a* to fix the region 10*a* to the base 9, and by then moving the waveguide forming region 10*b* along the intersecting dividing planes 8.

The position shifting member 17 in the above discussed embodiments is arranged such that the position shifting member 17 is secured in the first waveguide forming region 10*a* at its one end and is secured in the second waveguide forming region 10*b* at its other end. The position shifting member 17 can also be arranged as shown in FIGS. 12A and 12B and still control the insertion loss of the arrayed waveguide grating type optical multiplexer/demultiplexer. In FIGS. 12A and 12B, the position shifting member 17 is arranged to set its one end on the base 9 and its other end on one or both of the first and second waveguide forming regions 10*a* and 10*b* (on the first waveguide forming region 10*a* in FIGS. 12(*a*), 12(*b*). This arrangement is obtained by the following manufacturing method.

An arrayed waveguide grating chip is placed on the base 9 formed from a quartz plate or the like and having a shape of the letter U, as shown in FIG. 13A. The dividing line 80 is set in advance. Only the second waveguide forming region 10*b* is fixed to the base 9 using a thermally curable adhesive or the like. As shown in FIGS. 13B and 13C, the position shifting member 17 is then fixed such that the position shifting member 17 secures its one end on the first waveguide forming region 10*a* and its other end on the base 9. The waveguide forming region 10 is thereafter divided into the first waveguide forming region 10*a* and the second waveguide forming region 10*b* along the dividing line 80.

This arrangement maintains the distance between the first waveguide forming region 10*a* and the second waveguide forming region 10*b* in the intersecting dividing planes 8. Therefore, the light transmission characteristics before the waveguide forming region 10 is divided can be maintained after the division.

Though not shown in FIGS. 12A to 12D, the arrayed waveguide grating type optical multiplexer/demultiplexer therein may include a position shift preventing member such as the silicon plate 35 shown in FIG. 1A in the border region between the first waveguide forming region 10*a* and the second waveguide forming region 10*b*. Precision can be improved in terms of relative positions of the first waveguide forming region 10*a* and the second waveguide forming region 10*b* in the Z direction by providing such a position shift preventing member. In the arrayed waveguide grating type optical multiplexer/demultiplexer thus structured, the inventors have found that the insertion loss is increased by about 0.5 dB when the temperature of the arrayed waveguide grating changes from 5° C. to 75° C.

The structure of the base 9 is not particularly limited in the arrayed waveguide grating type optical multiplexer/demultiplexer to which the above manufacturing method is applied. However, the U-shaped base 9 obtained by forming a U groove 40 as above facilitates the division of the arrayed waveguide grating along the dividing lines 80.

In comparison with the position shifting member 17 shown in FIG. 12B, the position shifting member 17 shown in FIG. 12A is more suitable for accurate control of how far the first waveguide forming region 10*a* is moved. This is because the structure shown in FIG. 12B allows an adhesive 13 to uncontrollably run inward from its designated position in the longitudinal direction of the position shifting member 17, whereas there is no such uncontrollability regarding the adhesive 13 in the structure shown in FIG. 12A. The running adhesive 13 in the structure of FIG. 12B may make the length J' in the longitudinal direction of the position shifting member 17, which functions to move the first waveguide forming region 10*a*, shorter than the length J necessary to accurately move the first waveguide forming region 10*a*. The structure of FIG. 12A can prevent the free running of the adhesive 13 and hence the position shifting member 17 can be fixed more accurately.

Accordingly, it is preferable in the present invention to use the position shifting member 17 having the structure of FIG. 12A, or to secure the position shifting member 17 through the metal film 31 and the solder 30 on the front side of the waveguide forming region 10 or the back side of the substrate 1 as in the above discussed embodiments.

Figure 14A:
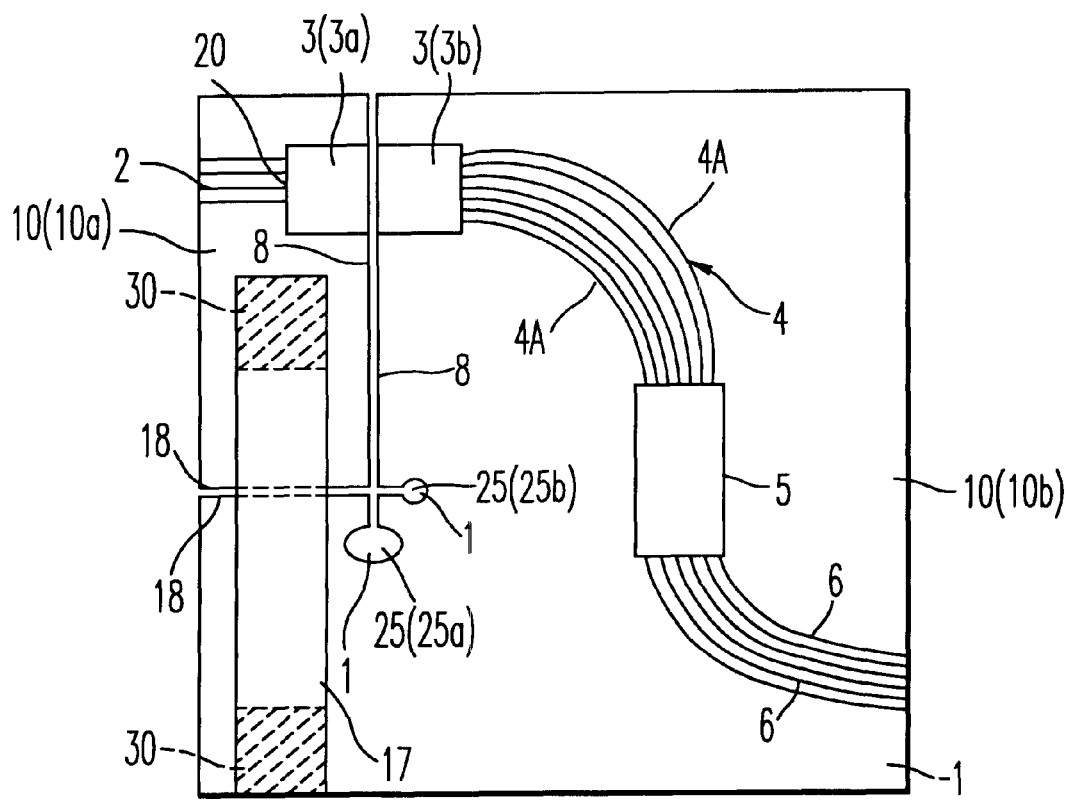
Figure 14B:
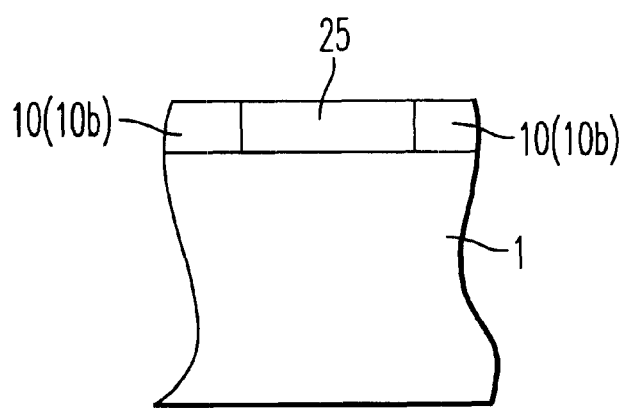

Through holes 25 may be formed in the structure where, as shown in FIG. 14A, the intersecting dividing planes 8 that intersect with one or both of the first slab waveguide 3 and the second slab waveguide 5 (the first slab waveguide 3 in FIG. 14A) start from one end of the waveguide forming region 10 and stretch to the midsection thereof. As shown in FIGS. 14A and 14B, the through holes 25 (25*a* and 25*b*) pierce the waveguide forming region 10 (here, the region 10*b*) from the front side thereof and reach the substrate 1 to connect with the space between the intersecting dividing planes 8 and the space between the non-intersecting dividing planes 18, respectively.

The through holes 25*a* and 25*b* are formed outside the area where the waveguide structure is formed. The side walls of the through holes have smooth surfaces. In the example illustrated in FIGS. 14A and 14B, the through hole 25*a* has a square-like shape in the X-Y plane. Each side of the square may be about 4 mm and each corner thereof may have a radius of curvature of 0.5 mm. The through hole 25*b* may also be circular in the X-Y plane and the diameter thereof may be 2.5 mm.

The arrayed waveguide grating type optical multiplexer/demultiplexer is reinforced by the through holes 25*a* and 25*b* connected with the space between the intersecting dividing planes 8 and the space between the non-intersecting dividing planes 18, respectively, as shown in FIGS. 14A and 14B. The strength thereof is enhanced against cracking or breakage of the ends of the intersecting dividing planes 8 and of the non-intersecting dividing planes 18 if, e.g., a module packaging the arrayed waveguide grating type optical multiplexer/demultiplexer is dropped by mistake during its handling.

In the arrayed waveguide grating type optical multiplexer/demultiplexer having the structure shown in FIGS. 14A and 14B, the through holes 25a and 25b may be respectively formed on the tips of dividing lines after the dividing lines are set. The dividing lines are for forming the dividing planes including the intersecting dividing planes 8 (here, the intersecting dividing planes 8 and the non-intersecting dividing planes 18). The dividing planes are for dividing the waveguide forming region 10 into the first waveguide forming region 10a and the second waveguide forming region 10b. Alternatively, the through holes 25a and 25b may be formed after the dividing lines are set and the metal film 31 is formed.

It is possible in the arrayed waveguide grating type optical multiplexer/demultiplexer having the structure shown in FIGS. 14A and 14B to form a hole in substrate 1 using etching by KOH or the like after the through holes 25a and 25b are formed.

The dividing planes such as the intersecting dividing planes 8 and the non-intersecting dividing planes 18 are formed by cutting in the embodiment modes above. However, the cleavage method (split-open) or other methods may be used to form these dividing planes.

According to a first aspect of the present invention, in the method of manufacturing a arrayed waveguide grating type optical multiplexer/demultiplexer, one or both of a first slab waveguide and a second slab waveguide are divided into two by intersecting planes that intersect the route of light traveling along one of the slab waveguides. The waveguide forming region is divided by the dividing planes into the first waveguide forming region that includes one divided slab waveguide and a second waveguide forming region that includes the other divided slab waveguide. A position shifting member with a function of moving one or both of the first and second waveguide forming regions along the dividing planes is fixed before the division such that the position shifting member secures its one end on the first waveguide forming region and secures its other end on the second waveguide forming region. Therefore, the relative positions of the first waveguide forming region and the second waveguide forming region before the division are almost the same as those after the division.

According to a second aspect of the present invention, in a method of manufacturing the arrayed waveguide grating type optical multiplexer/demultiplexer, the arrayed waveguide grating is placed on a base. As in the first aspect of the present invention, the waveguide forming region is divided into a first waveguide forming region and a second waveguide forming region. A position shifting member with a function of moving one or both of the first and second waveguide forming regions along the dividing planes is fixed before the division such that the member secures its one end on the base and secures its other end on one or both of the first and second waveguide forming regions. Therefore, the relative positions of the first waveguide forming region and the second waveguide forming region before the division are almost the same as those after the division.

The arrayed waveguide grating type optical multiplexer/demultiplexer manufactured by applying the manufacturing method of the present invention thus can maintain, after the waveguide forming region is divided, the light transmission characteristics before the division.

According to an arrayed waveguide grating type optical multiplexer/demultiplexer of the present invention, one or both of first and second slab waveguides are divided into two by intersecting planes that intersect the route of the light traveling along the waveguides. The intersecting planes serve as dividing planes and divide the waveguide forming region into a first waveguide forming region that includes one divided slab waveguide and a second waveguide forming region that includes the other divided slab waveguide. One or both of the first waveguide forming region and the second waveguide forming region are moved along the dividing planes by a position shifting member. Therefore, it is possible to compensate, with the use of the movement by the position shifting member, shifts in light transmission central wavelengths of the arrayed waveguide grating which is caused by, for example, the temperature change of the arrayed waveguide grating.

In the arrayed waveguide grating type optical multiplexer/demultiplexer according to the present invention, when the position shifting member is arranged such that its one end is secured on the first waveguide forming region and its other end is secured on the second waveguide forming region, the structure of the device is simplified and precision is improved. Furthermore, the cost of the device is reduced and the yield thereof is increased.

According to the arrayed waveguide grating type optical multiplexer/demultiplexer of the present invention, metal films are formed in the waveguide forming region, solder is formed on front side of areas for forming the metal films, and the position shifting member is fixed to the waveguide forming region through the solder and the metal films. Unlike the case in which the position shifting member is fixed by an adhesive, for example, the position. shifting member thus can be fixed exactly as designed without fear of adhesive running uncontrollably. This makes an excellent arrayed waveguide grating that has high temperature compensation precision of light transmission wavelengths of the arrayed waveguide grating.

According to the arrayed waveguide grating type optical multiplexer/demultiplexer of the present invention, one of the first waveguide forming region and the second waveguide forming region is fixed, whereas the other is moved by the position shifting member. The fixed waveguide forming region is clamped by the clamping member and held to the base of the arrayed waveguide grating type optical multiplexer/demultiplexer. Fixing one waveguide region makes it easy to smoothly move the other waveguide forming region.

According to the arrayed waveguide grating type optical multiplexer/demultiplexer of the present invention, one of the first waveguide forming region and the second waveguide forming region is fixed, whereas the other is moved by the position shifting member. A position shift preventing member for preventing the first and second waveguide forming regions from shifting toward the direction perpendicular to the substrate plane is provided in at least a part of the border region between the first waveguide forming region and the second waveguide forming region. The first and second waveguide forming regions are thus prevented from shifting toward the direction perpendicular to the substrate plane. Therefore, an increase in insertion loss by this positional shift can be controlled.

According to the arrayed waveguide grating type optical multiplexer/demultiplexer of the present invention, the position shift preventing member is formed from a plate-like material having a flat surface, and is arranged such that the flat surface abuts with the front side of the waveguide forming region or the back side of the substrate. The shift position preventing member can readily be formed using the plate-like material, and the positional shift of the first and second waveguide forming regions toward the direction perpendicular to the substrate plane can be prevented.

According to the arrayed waveguide grating type optical multiplexer/demultiplexer of the present invention when the position shifting member is a metal member, a metal member having a large thermal expansion rate is used to form the position shifting member. The arrayed waveguide grating type optical multiplexer/demultiplexer of the present invention is thus readily manufactured.

According to the arrayed waveguide grating type optical multiplexer/demultiplexer of the present invention, through holes piercing the waveguide forming region and reaching the substrate are formed from the front side of the waveguide forming region in areas outside the waveguide structure. The side walls of the through holes have smooth surfaces. The dividing planes that intersect with one or both of the first slab waveguide and the second slab waveguide start from one end of the waveguide forming region and stretch to the midsection thereof to communicate with the through holes. This enhances the strength thereof against cracking or breakage of the ends of the dividing planes when, e.g., a module packaging the arrayed waveguide grating type optical multiplexer/demultiplexer is dropped by mistake during its handling.

In the above discussion the position shifting member 17 has an operation to expand and contract to move one or both of the first and second waveguide forming regions along the dividing planes. In this context the position shifting member 17 operates as an expansion/contraction member. However, it should be apparent to those of ordinary skill in the art that other mechanisms for moving one or both of the first and second waveguides relative to each other could also be implemented instead of relying on a device which expands and contracts, as in the embodiments noted above. As one specific example, it is possible that a stepping motor could be utilized to shift one or both of the first and second waveguides relative to each other based on a sensed temperature. One of the important features of the present invention is that one or both of the first and second waveguides is shifted relative to each other, and other mechanisms which can induce such a shifting are also possible within the scope of the present invention.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A method of manufacturing an arrayed waveguide grating optical multiplexer/demultiplexer, comprising the steps of:

preparing an arrayed waveguide grating having a waveguide forming region for forming a waveguide structure and at least one slab waveguide;

setting dividing lines for determining dividing planes that intersect a route of light traveling along said at least one slab waveguide, said dividing planes dividing said at least one slab waveguide into first and second divided slab waveguide portions, and also dividing said waveguide forming region into a first waveguide forming region that includes the first divided slab waveguide portion and a second waveguide forming region that includes the second divided slab waveguide;

fixing a position shifting member to have a first end secured on said first waveguide forming region and to have a second end secured on said second waveguide forming region; and dividing said waveguide forming region into said first waveguide forming region and said second waveguide forming region along said dividing lines.

2. A method of manufacturing an arrayed waveguide grating optical multiplexer/demultiplexer according to claim 1, further comprising the step of:

placing said arrayed waveguide grating on a base prior to said step of setting dividing lines.

3. A method of manufacturing an arrayed waveguide grating optical multiplexer/demultiplexer according to claim 1, wherein said at least one slab waveguide includes first and second slab waveguides, and said prepared arrayed waveguide grating further includes:

one or more optical input waveguides arranged side by side;

said first slab waveguide connected to output ends of said optical input waveguides;

an arrayed waveguide connected to an output end of said first slab waveguide and including a plurality of channel waveguides arranged side by side, for transmitting light that has traveled through said first slab waveguide, said channel waveguides having different predetermined lengths;

said second slab waveguide connected to an output end of said arrayed waveguide; and one or more optical output waveguides arranged side by side and connected to an output end of said second slab waveguide.

4. A method of manufacturing an arrayed waveguide grating optical multiplexer/demultiplexer according to claim 3, further comprising the step of:

placing said arrayed waveguide grating on a base prior to said step of setting said dividing lines.

5. An arrayed waveguide grating optical multiplexer/demultiplexer, comprising:

a waveguide forming region configured to form a waveguide structure and including at least one slab waveguide, wherein said at least one slab waveguide is divided into two by dividing planes that intersect a route of light traveling along said at least one slab waveguide to form first and second divided slab waveguide portions, and wherein said waveguide forming region is divided by the dividing planes that divide said at least one slab waveguide, into a first waveguide forming region that includes the first divided slab waveguide and a second waveguide forming region that includes the second divided slab waveguide; and a position shifting member having a first end secured to said first waveguide forming region and a second end secured to said second waveguide forming region, said position shifting member configured to move at least one of said first waveguide forming region and said second waveguide forming region along said dividing planes.

6. An arrayed waveguide grating optical multiplexer/demultiplexer according to claim 5, wherein said position shifting member expands and contracts.

7. An arrayed waveguide grating optical multiplexer/demultiplexer according to claim 5, further comprising:

a base on which said arrayed waveguide grating is placed.

8. An arrayed waveguide grating optical multiplexer/demultiplexer according to claim 5, wherein said at least one slab waveguide includes first and second slab waveguides, and further comprising:

one or more optical input waveguides arranged side by side;

said first slab waveguide connected to output ends of said optical input waveguides;

an arrayed waveguide connected to an output end of said first slab waveguide and including a plurality of channel waveguides arranged side by side, and configured to transmit light that has traveled through said first slab waveguide, said channel waveguides having different predetermined lengths;

said second slab waveguide connected to an output end of said arrayed waveguide; and one or more optical output waveguides arranged side by side and connected to an output end of said second slab waveguide.

9. An arrayed waveguide grating optical multiplexer/demultiplexer according to claim 5, further comprising:

metal films formed in said waveguide forming region;

solder provided on said metal films; and wherein said position shifting member is fixed to said waveguide forming region through said solder and said metal films.

10. An arrayed waveguide grating type optical multiplexer/demultiplexer according to claim 7, wherein one of said first waveguide forming region and said second waveguide forming region is fixed whereas the other is moved by said position shifting member, and further comprising:

a clamping member configured to clamp the fixed waveguide forming region to said base.

11. An arrayed waveguide grating type optical multiplexer/demultiplexer according to claim 5, wherein one of said first waveguide forming region and said second waveguide forming region is fixed whereas the other is moved by said position shifting member, and further comprising:

a position shift preventing member configured to prevent said first and second waveguide forming regions from shifting in a direction perpendicular to a substrate plane, said position shift preventing member provided in at least a part of a border region between said first waveguide forming region and said second waveguide forming region.

12. An arrayed waveguide grating type optical multiplexer/demultiplexer according to claim 11, wherein said position shift preventing member is formed from a plate-like material having a flat surface and is arranged such that the flat surface abuts with a front side of said waveguide forming region or a back side of said substrate.

13. An arrayed waveguide grating type optical multiplexer/demultiplexer according to claim 6, wherein said position shifting member is a metal member.

14. An arrayed waveguide grating type optical multiplexer/demultiplexer according to claim 5, further comprising:

through holes piercing said waveguide forming region and reaching a substrate and formed in said waveguide forming region in areas outside said waveguide structure;

wherein side walls of said through holes have smooth surfaces; and wherein said dividing planes that intersect said at least one slab waveguide start from one end of said waveguide forming region and extend to connect with said through holes.

15. An arrayed waveguide grating optical multiplexer/demultiplexer, comprising:

waveguide forming means for forming a waveguide structure and including at least one slab waveguide means, wherein said at least one slab waveguide means is divided into two by dividing means for intersecting a route of light traveling along said at least one slab waveguide means to form first and second divided slab waveguide means, and wherein said waveguide forming means is divided by the dividing means that divide said at least one slab waveguide means into a first waveguide forming region means that includes the first divided slab waveguide means and a second waveguide forming region means that includes the second divided slab waveguide means; and position shifting means for moving at least one of said first waveguide forming region means and said second waveguide forming region means along said dividing means.

16. An arrayed waveguide grating optical multiplexer/demultiplexer according to claim 15, wherein said position shifting means expands and contracts.

17. An arrayed waveguide grating optical multiplexer/demultiplexer according to claim 15, further comprising:

base means for placing said arrayed waveguide grating thereon.

18. An array waveguide optical multiplexer/demultiplexer according to claim 15, wherein said at least one slab waveguide means includes first and second slab waveguide means, and further comprising:

optical input waveguide means;

said first slab waveguide connected to an output end of said optical input waveguide means;

arrayed waveguide means connected to an output end of said first slab waveguide means for transmitting light that has traveled through said first slab waveguide;

said second slab waveguide means connected to an output end of said arrayed waveguide means; and optical output waveguide means connected to an output end of said second slab waveguide means.

19. An arrayed waveguide grating optical multiplexer/demultiplexer according to claim 15, further comprising:

metal film means formed in said waveguide forming means;

solder means provided on said metal film means; and wherein said position shifting means is fixed to said waveguide forming means through said solder means and said metal film means.

20. An arrayed waveguide grating type optical multiplexer/demultiplexer according to claim 19, further comprising:

clamping means for clamping one of said first and second waveguide forming region means to said base means.

21. An arrayed waveguide grating type optical multiplexer/demultiplexer according to claim 19, further comprising:

position shift preventing means for preventing said first and second waveguide forming region means from shifting in a direction perpendicular to a substrate plane.

22. An arrayed waveguide grating type optical multiplexer/demultiplexer according to claim 19, further comprising:

through hole means for piercing said waveguide forming region and reaching a substrate; and wherein said dividing means that intersect said at least one slab waveguide means start from one end of said waveguide forming region means and extend to connect with said through hole means.

* * * * *